United States Patent
Chang et al.

(10) Patent No.: US 8,332,704 B2
(45) Date of Patent: Dec. 11, 2012

(54) APPARATUS AND METHOD FOR SUPPORTING AUTOMATIC RETRANSMISSION REQUEST (ARQ) IN A WIRELESS RELAY COMMUNICATION SYSTEM

(75) Inventors: Young-Bin Chang, Anyang-si (KR); Taori Rakesh, Suwon-si (KR); Hyun-Jeong Kang, Seoul (KR); Jung-Je Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 944 days.

(21) Appl. No.: 12/402,915

(22) Filed: Mar. 12, 2009

(65) Prior Publication Data

US 2009/0235138 A1    Sep. 17, 2009

(30) Foreign Application Priority Data

Mar. 14, 2008  (KR) .......... 10-2008-0024105
Mar. 19, 2008  (KR) .......... 10-2008-0025560

(51) Int. Cl.
*H04L 1/18*    (2006.01)
*H04B 7/00*    (2006.01)
(52) U.S. Cl. ............ 714/748; 370/310
(58) Field of Classification Search .......... 714/748, 714/749, 776; 370/310
See application file for complete search history.

(56) References Cited

U.S. PATENT DOCUMENTS

| | | | |
|---|---|---|---|
| 2008/0108304 A1* | 5/2008 | Suga | 455/7 |
| 2008/0155148 A1* | 6/2008 | Oyman | 710/106 |
| 2008/0219214 A1* | 9/2008 | Chen et al. | 370/331 |
| 2009/0003378 A1* | 1/2009 | Sachs | 370/466 |

OTHER PUBLICATIONS

Wiemann, H.; Meyer, M.; Ludwig, R.; Chang Pae O; , "A novel multi-hop ARQ concept," Vehicular Technology Conference, 2005. VTC 2005-Spring. 2005 IEEE 61st , vol. 5, no., pp. 3097-3101 vol. 5, May 30-Jun. 1, 2005.*

Rashid, I.; So, D.K.C.; , "Novel HARQ schemes for MIMO single-hop and Multi-hop relay systems," Personal Indoor and Mobile Radio Communications (PIMRC), 2010 IEEE 21st International Symposium on , vol., no., pp. 2523-2527, Sep. 26-30, 2010.*

* cited by examiner

*Primary Examiner* — Cynthia Britt
(74) *Attorney, Agent, or Firm* — Jefferson IP Law, LLP

(57) ABSTRACT

A wireless multi-hop relay communication system includes a terminal for transmitting an Automatic Retransmission reQuest (ARQ) block of a Media Access Control (MAC) layer in an access link, an access link relay station for determining if there is an error in the ARQ block received on the access link and for sending the ARQ block to an upper node over a relay link when the ARQ block has no error, and a base station for determining if there is an error in the ARQ block received over the relay link.

12 Claims, 22 Drawing Sheets

APPARATUS AND METHOD FOR SUPPORTING AUTOMATIC RETRANSMISSION REQUEST (ARQ) IN A WIRELESS RELAY COMMUNICATION SYSTEM

PRIORITY

This application claims the benefit under 35 U.S.C. §119 (a) of a Korean patent application filed in the Korean Intellectual Property Office on Mar. 14, 2008 and assigned Serial No. 10-2008-0024105 and a Korean patent application filed in the Korean Intellectual Property Office on Mar. 19, 2008 and assigned Serial No. 10-2008-0025560, the entire disclosures of each of which are hereby incorporated by reference.

BACKGROUND OF THE INVENTION

1. Field of the Invention

The present invention relates to a wireless relay communication system. More particularly, the present invention relates to an apparatus and a method for Automatic Retransmission reQuest (ARQ) of a Media Access Control (MAC) layer in a wireless relay communication system.

2. Description of the Related Art

In a data exchange between a transmitter and a receiver in a wireless communication system, an error may occur according to a channel condition of radio resources. Error control and recovery techniques include Automatic Retransmission reQuest (ARQ) and a Forward Error Check (FEC). When ARQ is implemented, the receiver requests retransmission of corrupted data from the transmitter. When FEC is implemented, the receiver corrects the corrupted data.

When the wireless communication system adopts ARQ, the receiver determines if there is an error by decoding a received packet. When the received packet has no error, the receiver sends an ACKnowledge (ACK) message to the transmitter. When the received packet has an error, the receiver sends a Non-ACK (NACK) message to the transmitter. Upon receiving the ACK message from the receiver, the transmitter transmits a new packet. In contrast, upon receiving the NACK message, the transmitter retransmits the packet to the receiver.

To provide a satisfactory radio channel to a terminal traveling in a cell boundary or shadow area, recent wireless communication systems provide a relay service using a relay station. The wireless communication system implementing the relay service can provide a satisfactory radio channel between a base station and the terminal by relaying data transmitted and received between the base station and the terminal by way of the relay station. For doing so, there is a need to implement ARQ using the relay station in the wireless relay communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for an Automatic Retransmission reQuest (ARQ) of a Media Access Control (MAC) layer in a wireless relay communication system.

Another aspect of the present invention is to provide an apparatus and method for ARQ of a MAC layer for an uplink communication in a wireless relay communication system.

Yet another aspect of the present invention is to provide an apparatus and a method for operating an ARQ channel including a relay link and an access link in a wireless relay communication system.

In accordance with an aspect of the present invention, a wireless multi-hop relay communication system is provided. The system includes a terminal for transmitting an Automatic Retransmission reQuest (ARQ) block of a Media Access Control (MAC) layer in an access link, an access link relay station for determining if there is an error in the ARQ block received on the access link and for sending the ARQ block to an upper node over a relay link when the ARQ block has no error, and a base station for determining if there is an error in the ARQ block received over the relay link.

In accordance with another aspect of the present invention, an uplink communication method of a relay station on an access link in a wireless multi-hop relay communication system is provided. The method includes receiving an Automatic Retransmission reQuest (ARQ) block of a Media Access Control (MAC) layer from a terminal over an access link, determining if there is an error in the ARQ block, when the ARQ block has an error, sending Non-ACKnowledge (NACK) to the terminal, and, when the ARQ block has no error, transmitting the ARQ block to an upper node in a relay link.

In accordance with yet another aspect of the present invention, an uplink communication method of a relay station on a relay link in a wireless multi-hop relay communication system is provided. The method includes determining if there is an error in an Automatic Retransmission reQuest (ARQ) block of a Media Access Control (MAC) layer received from a lower node, when the ARQ block has an error, sending Relay-Non-ACKnowledge (R-NACK) to the lower node, and, when the ARQ block has no error, transmitting the ARQ block to a base station.

In accordance with still another aspect of the present invention, an apparatus for a relay station on an access link in a wireless multi-hop relay communication system is provided. The apparatus includes a receiver for receiving an Automatic Retransmission reQuest (ARQ) block of a Media Access Control (MAC) layer from a terminal over an access link, a determiner for determining if there is an error in the ARQ block, and a transmitter for sending a Non-ACKnowledge (NACK) to the terminal when the ARQ block has an error, and for transmitting the ARQ block to an upper node over a relay link when the ARQ block has no error.

In accordance with yet another aspect of the present invention, an apparatus for a relay station on a relay link in a wireless multi-hop relay communication system is provided. The apparatus includes a determiner for determining if there is an error in an Automatic Retransmission reQuest (ARQ) block of a Media Access Control (MAC) layer received from a lower node, and a transmitter for sending Relay-Non-ACKnowledge (R-NACK) to the lower node when the ARQ block has an error, and for transmitting the ARQ block to a base station when the ARQ block has no error.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
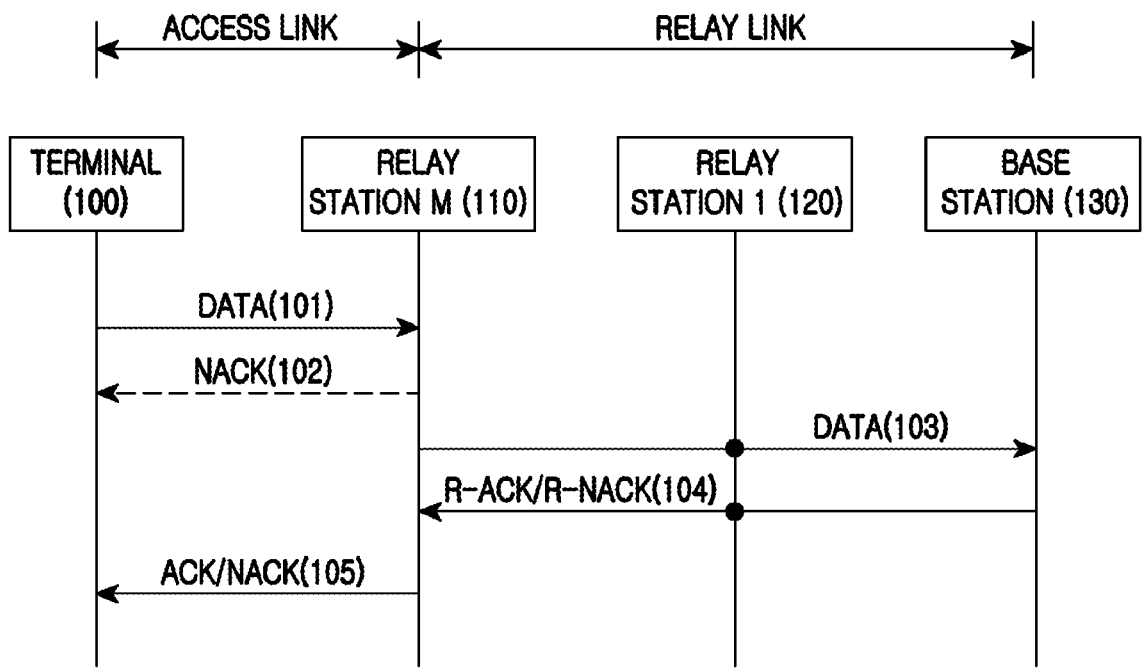
FIG. 1 illustrates information exchangeable in links on an uplink communication in a wireless relay communication system according to a first exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a technique for an Automatic Retransmission reQuest (ARQ) of a Media Access Control (MAC) layer in a wireless relay communication system.

In the wireless relay communication system, there are two or more hops between a base station and a terminal. That is, there lies at least one relay station between the base station and the terminal. A link between the terminal and the relay station directly connected to the terminal is referred to as an access link, and a link between the base station and the relay station directly connected to the terminal and a link between the relay station and another relation station is referred to as a relay link.

To facilitate a better understanding of the present disclosure, the relay station directly connected to the terminal is referred to as a 'relay station M'. While there may be at least one relay station between the relay station M and the base station, it is assumed that there is only one relay station between the relay station M and the base station. The relay station between the relay station M and the base station and directly connected to the base station is referred to as a 'relay station 1'.

In the drawings, information indicated by a solid line represents information essentially delivered, and information indicated by a dotted line represents information omittable according to intentions of the practitioner. Hereinafter, data indicates a transmission unit according to ARQ of the MAC layer and can be represented using an ARQ block or a Tunnel Data Unit (TDU).

In the wireless relay communication system, an ARQ channel is established in the link between the terminal and the relay station M, that is, in the access link, and constituted in the link between the relay station M and the base station, that is, in the relay link. In exemplary embodiments of the present invention, the type of information exchanged in the links varies.

FIG. 1 illustrates information exchangeable over links in an uplink communication in a wireless relay communication system according to a first exemplary embodiment of the present invention.

Referring to FIG. 1, a terminal 100 transmits data to a relay station M 110 in step 101. The relay station M 110, in step 102, transmits to the terminal 100 a NACK indicative of its reception failure. The NACK indicative of the reception failure of the relay station M 110 may be omitted. The relay station M 110 forwards the data to the base station 130 via the relay station 1 120 in step 103. The base station 130, in step 104, sends to the relay station M 110, via the relay station 1 120, one of a Relay-ACK (R-ACK) indicative of its reception success and an R-NACK indicative of its reception failure. The relay station M 110 sends an ACK/NACK to the terminal 100 in step 105.

When the data is transmitted from the terminal 100 to the relay station M 110 as illustrated in FIG. 1, the NACK indicative of the data reception failure can be sent from the relay station M 110 to the terminal 100. When successfully receiving the data, the relay station M 110 does not have to send the ACK to the terminal 100. The relay station 1 120 does not have to determine whether the data is successfully received, but may merely relay the data and the R-ACK/R-NACK.

Now, an information exchange according to the ARQ of the MAC layer in the wireless relay communication system is described in a specific situation according to the first exemplary embodiment of the present invention.

Figure 2:
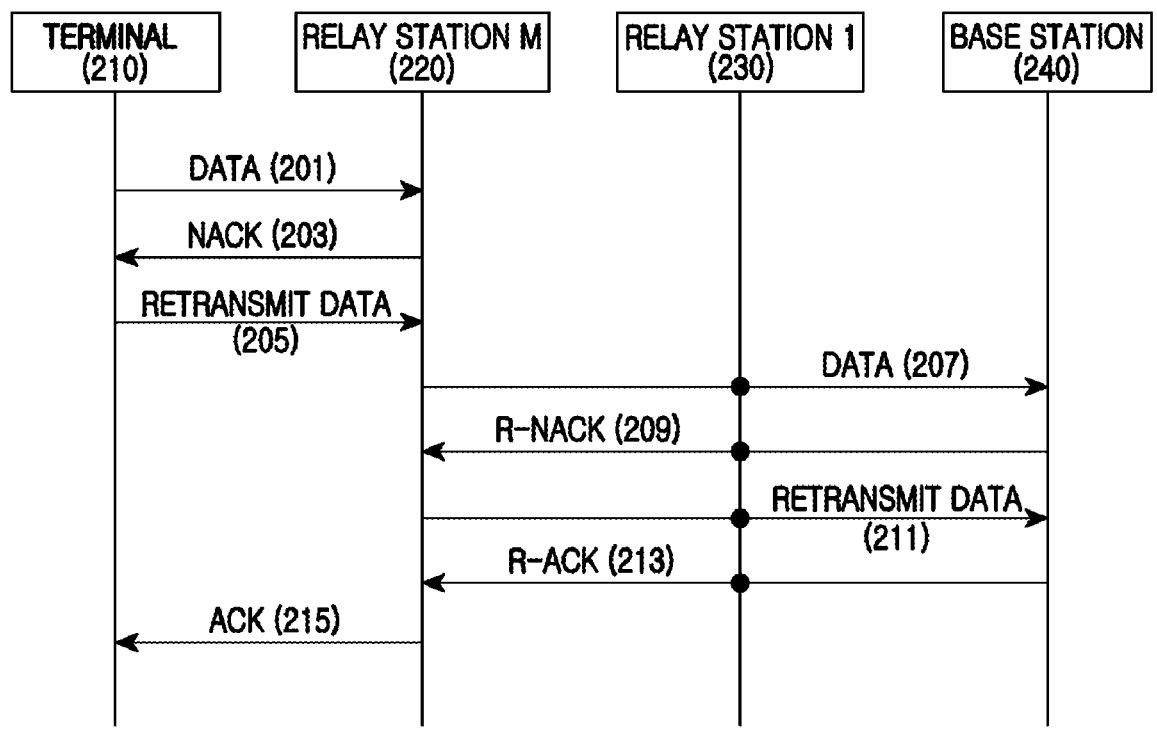
FIGS. 2 and 3 illustrate information exchanges in a wireless relay communication system according to the first exemplary embodiment of the present invention.

FIG. 2 illustrates information exchanges in a wireless relay communication system according to the first exemplary embodiment of the present invention. While only one relay station 1 230 is depicted in FIG. 2, there can be no or two or more relay station is 230.

Referring to FIG. 2, the terminal 210 transmits data to the relay station M 220 in step 201. The relay station M 220 receiving the data determines if there is an error. For example, the relay station M 220 determines if there is an error using Cyclic Redundancy Check (CRC) bits in a MAC Packet Data Unit (PDU) of the data. Here, it is assumed that the data has error.

If it is determined that there is an error, the relay station M 220 transmits a NACK to the terminal 210 in step 203. The terminal 210, upon receiving the NACK, retransmits the data to the relay station M 220 in step 205. The relay station M 220 receiving the data determines if there is an error. At this time, the data is free from error. That is, it is assumed that the relay station 220 successfully receives the data.

Upon determining that there is no error, the relay station M 220 relays the data to the base station 240 in the relay link in step 207. Herein, the data is received at the base station 240 by way of the relay station 1 230. The base station 240, upon receiving the data, determines if there is an error. It is assumed the data is compromised.

Upon determining that there is an error, the base station 240 sends an R-NACK to the relay station M 220 over the relay link in step 209. The R-NACK is received at the relay station M 220 via the relay station 1 230. The relay station M 220, upon receiving the R-NACK, retransmits the data to the base station 240 in step 211. The data is received at the base station 240 via the relay station 1 230. The base station 240 receiving the data determines if there is an error. It is assumed that the data has no error. That is, the base station 240 successfully receives the data.

Upon determining that there is no error, the base station 240 sends an R-ACK to the relay station M 220 in step 213. The R-ACK is received at the relay station M 220 via the relay station 1 230. The relay station M 220, upon receiving the R-ACK, confirms the successful data reception of the base station 240 based on the R-ACK and then transmits an ACK to the terminal 210 in step 215.

Figure 3:
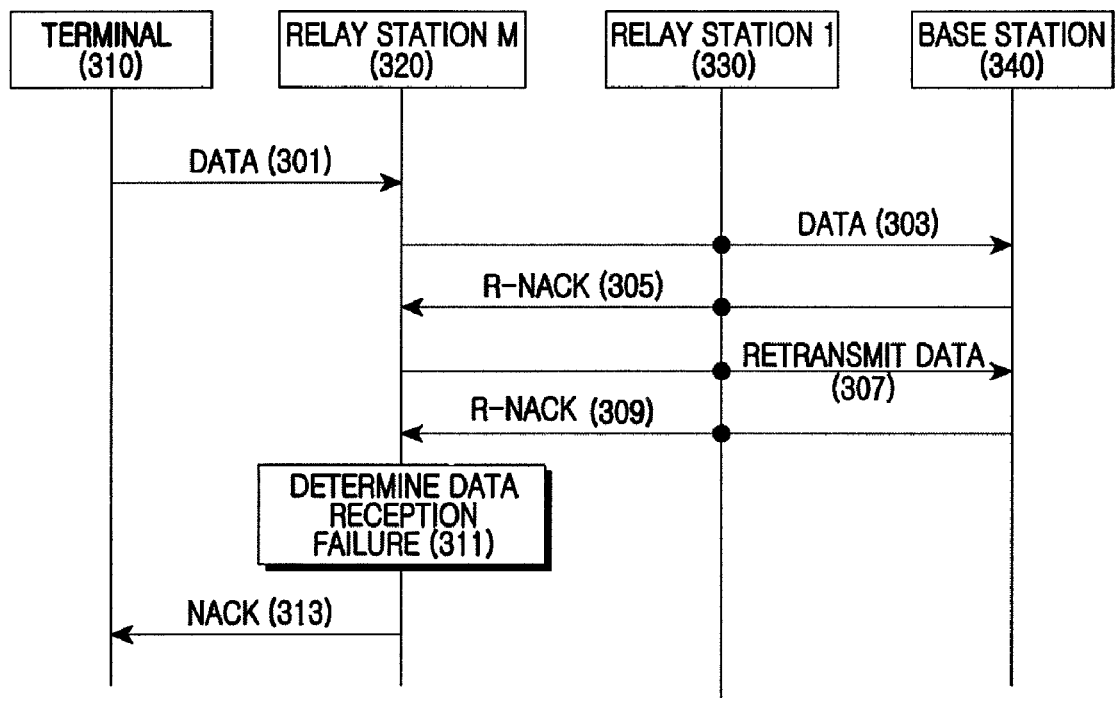

FIG. 3 illustrates other information exchanges in a wireless relay communication system according to the first exemplary embodiment of the present invention.

Referring to FIG. 3, the terminal 310 transmits data to the relay station M 320 in step 301. The relay station M 320, upon receiving the data, determines if there is an error. For example, the relay station M 320 determines if there is an error using CRC bits in a MAC PDU of the data. It is assumed that the data has no error. That is, the relay station M 320 successfully receives the data.

Upon determining that there is no error, the relay station M 320 forwards the data to the base station 340 in the relay link in step 303. The data is received at the base station 340 via the relay station 1 330. The base station 340, upon receiving the data, determines if there is an error. It is assumed that it is determined that there is an error.

The base station 340 determining that there is an error sends an R-NACK to the relay station M 320 over the relay link in step 305. The R-NACK is received at the relay station M 320 by way of the relay station 1 330. Upon receiving the R-NACK, the relay station M 320 retransmits the data to the base station 340 in step 307. The retransmitted data is received at the base station 340 via the relay station 1 330.

The base station 340 receiving the data determines if there is an error. It is assumed that there is an error. Upon determining that there is the error, the base station 340 sends an R-NACK to the relay station M 320 in step 309. The R-NACK is received at the relay station M 320 via the relay station 1 330.

Next, the relay station M 320 recognizes that an ARQ timer expires. Herein, the ARQ timer is used to determine whether the final data reception fails. The ARQ timer may be managed regardless of the reception of the R-ACK and the R-NACK. In other words, while the retransmission is repeated until the ARQ timer expires, the reception failure of the final data may be determined at the expiration of the ARQ timer. A time value from the start to the expiration of the ARQ timer is defined as an ARQ_BLOCK_LIFETIME. The relay station M 320 determines the data reception failure by recognizing the expiration of the ARQ timer before the retransmission according to the R-NACK in step 311. Thus, the relay station M 320 transmits a NACK to the terminal 310 in step 313.

In step 311, the relay station M 320 determines the final data reception failure based on the expiration of its ARQ timer. Yet, the final data reception failure may be determined by the expiration of the ARQ timer of the terminal 310. More specifically, when the ARQ timer managed by the terminal 310 expires, the terminal 310 sends a signal informing of the ARQ timer expiration to the relay station M 320. The relay station M 320 recognizes the ARQ timer expiration of the terminal 310 and determines the final data reception failure. Here, since the terminal 310 recognizes the final data reception failure, step 313 is omitted.

Figure 4:
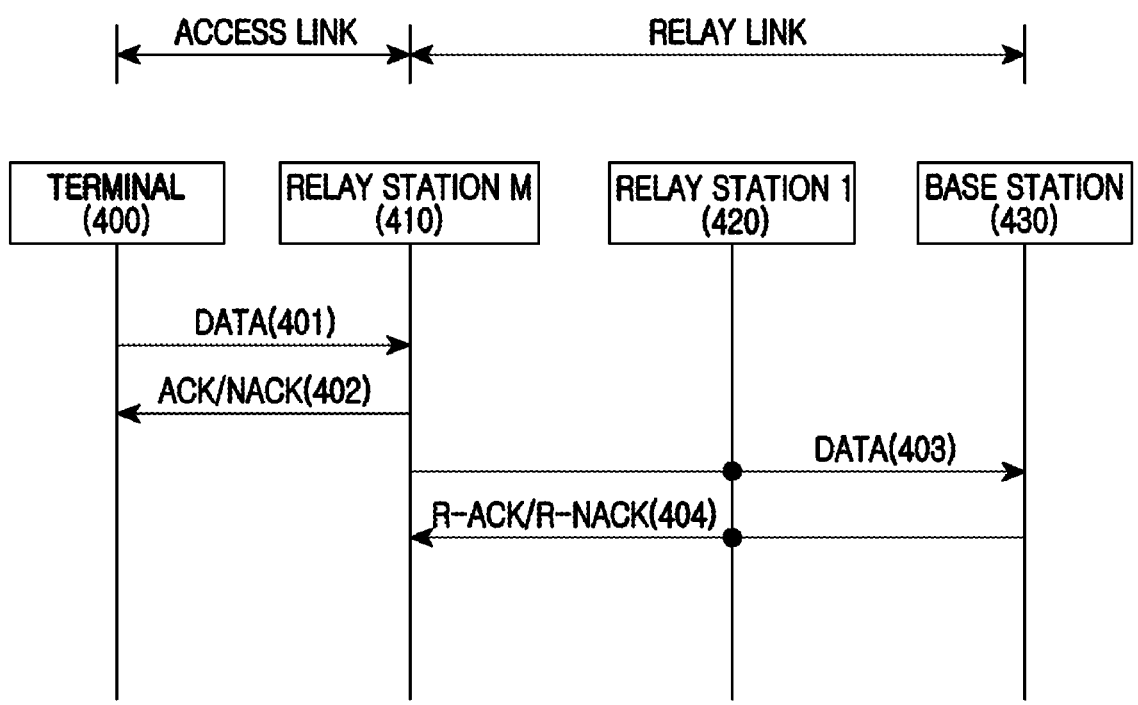
FIG. 4 illustrates information exchangeable in links on an uplink communication in a wireless relay communication system according to a second exemplary embodiment of the present invention.

FIG. 4 illustrates information exchangeable over links in an uplink communication in a wireless relay communication system according to a second exemplary embodiment of the present invention.

Referring to FIG. 4, after a terminal 400 transmits data to a relay station M 410 in step 401, the relay station M 410 transmits an ACK/NACK indicative of its reception success/failure to the terminal 400 in step 402. After successful reception of the data from the terminal 400, the relay station M 410 forwards the data to the base station 430 via the relay station 1 420 in step 403. Thereafter, the base station 430 sends an R-ACK/R-NACK indicative of its reception success/failure to the relay station M 410 via the relay station 1 420 in step 404.

As illustrated in FIG. 4, when the data is transmitted from the terminal 400 to the relay station M 410, the relay station M 410 transmits the ACK/NACK indicative of its data reception success/failure to the terminal 400. That is, regardless of the success or the failure of the data reception of the base station 430, the terminal 400 receives the ACK when the relay station M 410 successfully receives the data.

Figure 5:
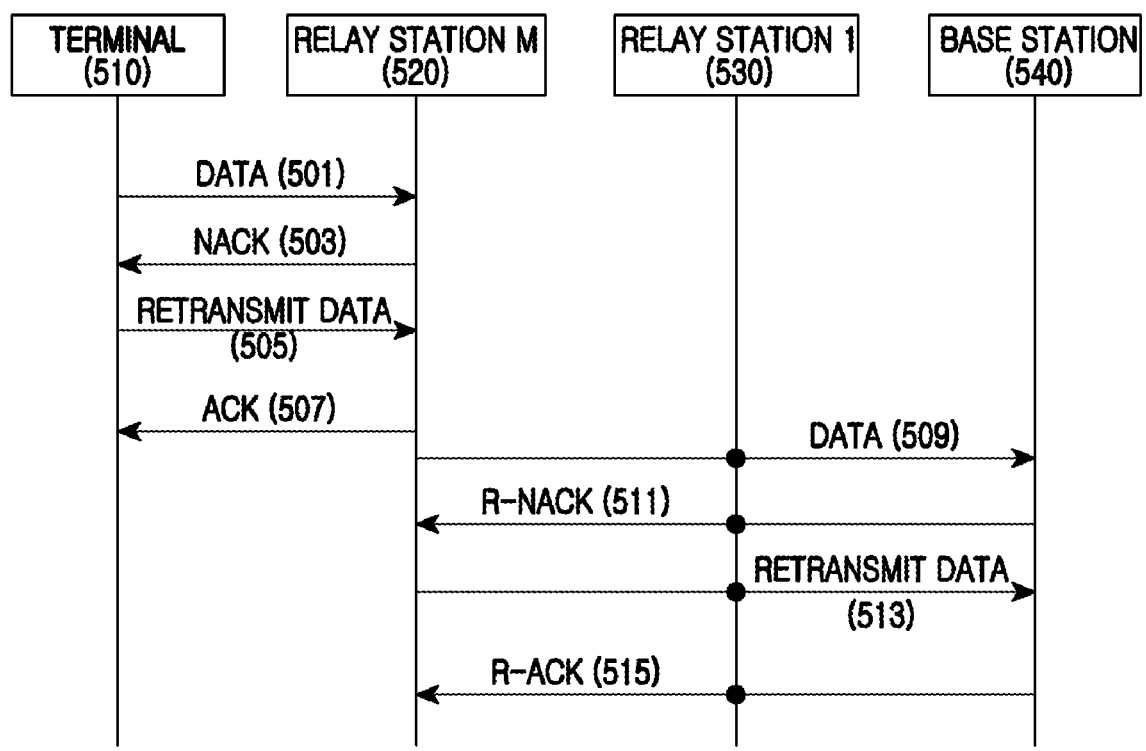
FIG. 5 illustrates information exchanges in a wireless relay communication system according to the second exemplary embodiment of the present invention.

FIG. 5 illustrates information exchanges in a wireless relay communication system according to the second exemplary embodiment of the present invention.

Referring to FIG. 5, the terminal 510 transmits data to the relay station M 520 in step 501. The relay station M 520, upon receiving the data, determines if there is an error. For example, the relay station M 520 determines if there is an error using CRC bits in a MAC PDU of the data. It is assumed that it is determined that there is an error.

Upon determining that there is an error, the relay station M 520 sends a NACK to the terminal 510 in step 503. The terminal 510, upon receiving the NACK, retransmits the data to the relay station M 520 in step 505. The relay station M 520 determines if there is an error. At this time, it is assumed that it is determined that there is no error. That is, that the data is successfully received.

Upon determining that there is no error, the relay station M 520 sends an ACK to the terminal 510 in step 507. The relay station M 520, upon successfully receiving the data, relays the data to the base station 540 in the relay link in step 509. Herein, the data is received at the base station 540 by way of the relay station 1 530. The base station 540, upon receiving the data, determines if there is an error. It is assumed the data is corrupted.

Upon determining that there is an error, the base station 540 sends an R-NACK to the relay station M 520 over the relay link in step 511. The R-NACK is received at the relay station M 520 via the relay station 1 530.

The relay station 520, upon receiving the R-NACK, retransmits the data to the base station 540 in step 513. The data is received at the base station 540 via the relay station 1 530. The base station 540, upon receiving the data, determines if there is an error. It is assumed that it is determined that there is no error. That is, the base station 540 successfully receives the data. Upon determining that there is no error, the base station 540 sends an R-ACK to the relay station M 520 in step 515. The R-ACK is received at the relay station M 520 via the relay station 1 530.

Operations of the relay station for an ARQ of a MAC layer according to the first or second exemplary embodiment of the present invention are described below.

Figure 6:
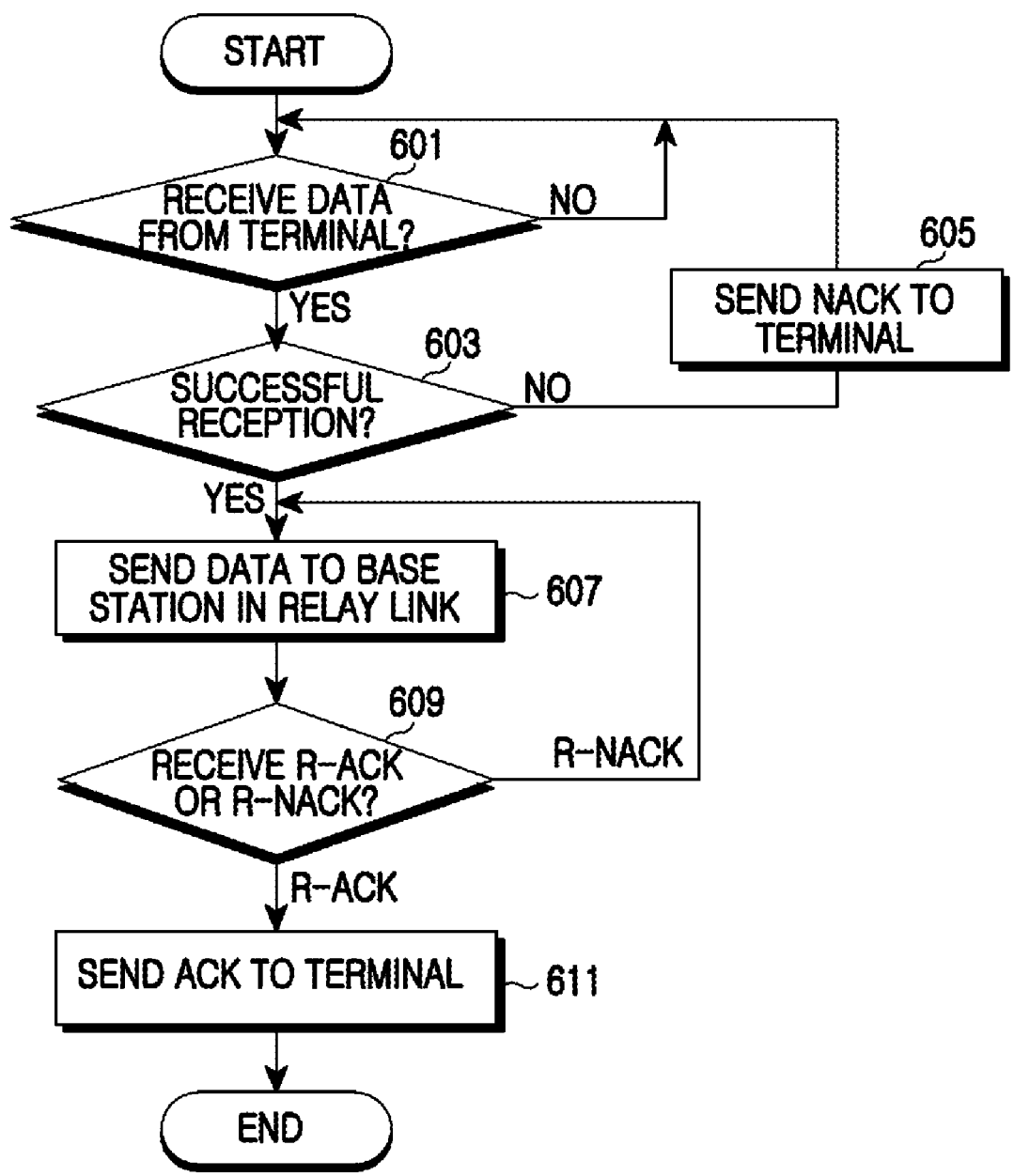
FIG. 6 illustrates an uplink communication process of a relay station connected to a terminal in a wireless relay communication system according to the first exemplary embodiment of the present invention.

FIG. 6 is a flowchart outlining an uplink communication process of a relay station M in a wireless relay communication system according to the first exemplary embodiment of the present invention.

Referring to FIG. 6, in step 601, the relay station M determines whether data is received from the terminal. Herein, the data indicates data that is the basis of determining error according to an ARQ of a MAC layer. Accordingly, a single physical signal reception can deliver a plurality of data, or two or more physical signal receptions can deliver only one data. To ease the understanding of the present disclosure, only one data is described below.

Upon receiving the data, the relay station M determines whether the data reception is successful in step 603. That is, the relay station M determines if there is an error in the received data. For example, the relay station M determines if there is an error using the CRC bits of the data.

When the data reception fails, the relay station M sends an NACK to the terminal in step 605 and returns to step 601. Namely, the relay station M transmits a request for data retransmission to the terminal by informing the terminal of the data reception failure.

In contrast, if the data reception is successful, the relay station M relays the data to the base station in the relay link in step 607. Herein, the relay link may include a plurality of hops with at least one relay station 1, or may include a single hop between the relay station M and the base station.

In step 609, the relay station M determines whether an R-ACK or an R-NACK is received from the base station. That is, the relay station M determines whether the base station informs of its data reception success or its reception failure. When receiving the R-NACK, the process returns to step 607 and the relay station M retransmits the data.

When receiving the R-ACK, the relay station M sends an ACK to the terminal in step 611 and then finishes the process. In other words, the relay station M informs the terminal that the final data reception is successful. That is, that the data is delivered to the base station.

In FIG. 6, the operations according to an ARQ timer have been omitted for brevity. When the ARQ timer is employed, the relay station relays the data to the base station in the relay link and then operates the ARQ timer. When the ARQ timer expires, the relay station determines the failure of the final data reception and finishes the ARQ process in the relay link.

Figure 7:
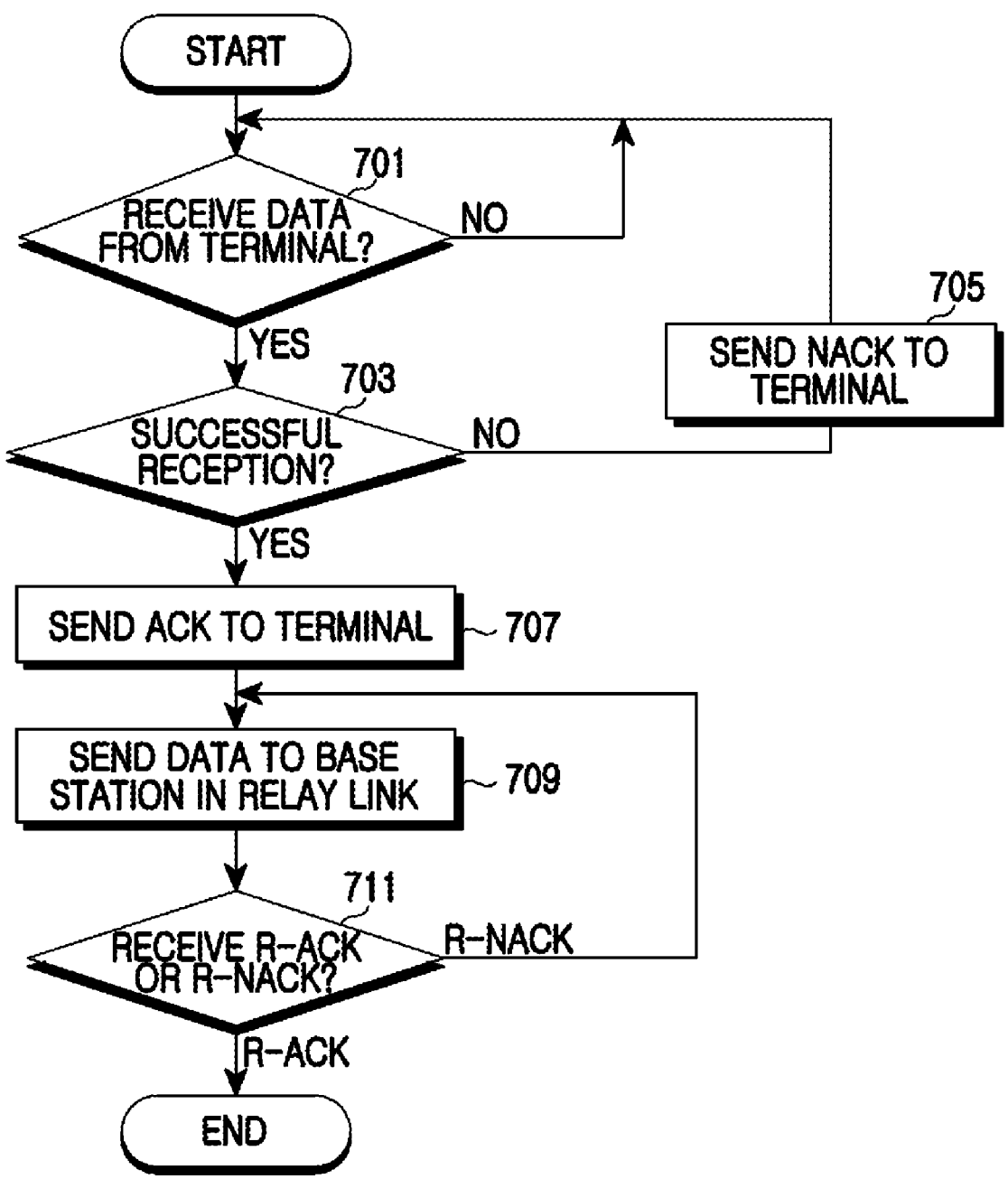
FIG. 7 illustrates an uplink communication process of a relay station connected to a terminal in a wireless relay communication system according to the second exemplary embodiment of the present invention.

FIG. 7 is a flowchart outlining the uplink communication process of a relay station connected to a terminal in a wireless relay communication system according to the second exemplary embodiment of the present invention.

Referring to FIG. 7, in step 701, the relay station M determines whether data is received from the terminal. Herein, the data indicates data that is the basis of determining error according to an ARQ of a MAC layer. Accordingly, a single physical signal reception can deliver a plurality of data, or two or more physical signal receptions can deliver only one data. To ease the understanding of the present disclosure, only one data is described below.

Upon receiving the data, the relay station M determines whether the data reception is successful in step 703. That is, the relay station M determines if there is an error in the received data. For example, the relay station M determines if there is an error using the CRC bits of the data When the data reception fails, the relay station M sends an NACK to the terminal in step 705 and returns to step 701.

Namely, the relay station M transmits a request for data retransmission to the terminal by informing the terminal of the data reception failure.

In contrast, if the data reception is successful, the relay station M sends an ACK to the terminal in step 707. Herein, the relay station M informs the terminal of its data reception success.

In step 709, the relay station M forwards the data to the base station in the relay link. In so doing, the relay link may include a plurality of hops with at least one relay station 1, or may include a single hop between the relay station M and the base station.

In step 711, the relay station M determines whether an R-ACK or an R-NACK is received from the base station. That is, the relay station M determines whether the base station informs of its data reception success or of its data reception failure.

When receiving the R-NACK, the relay station M returns to step 709 and retransmits the data. When receiving the R-ACK, the relay station M recognizes the successful data reception and then finishes the process.

In FIG. 7, the operations according to an ARQ timer have been omitted for brevity. When the ARQ timer is employed, the relay station relays the data to the base station in the relay link and then operates the ARQ timer. When the ARQ timer expires, the relay station determines the failure of the final data reception and finishes the ARQ process in the relay link.

In the first or second exemplary embodiment of FIGS. 1 through 7, only the relay station directly communicating with the terminal, that is, only the relay station M, determines if there is an error according to the ARQ of the MAC layer. In various exemplary embodiments of the present invention, a relay station may not be directly communicating with the terminal to determine if there is an error according to the ARQ of the MAC layer. Yet, when the base station fails to receive the data, the data retransmission begins at the relay station M. Hence, the relay station M retransmits the data to the upper relay station. However, when the relay station M recognizes the successful data reception of the upper relay station, the relay station M can send an instruction to retransmit the data, instead of retransmitting the data.

Exemplary embodiments, where every relay station determines if there is an error according to the ARQ of the MAC layer, are described below with reference to FIGS. 8 and 9.

Figure 8:
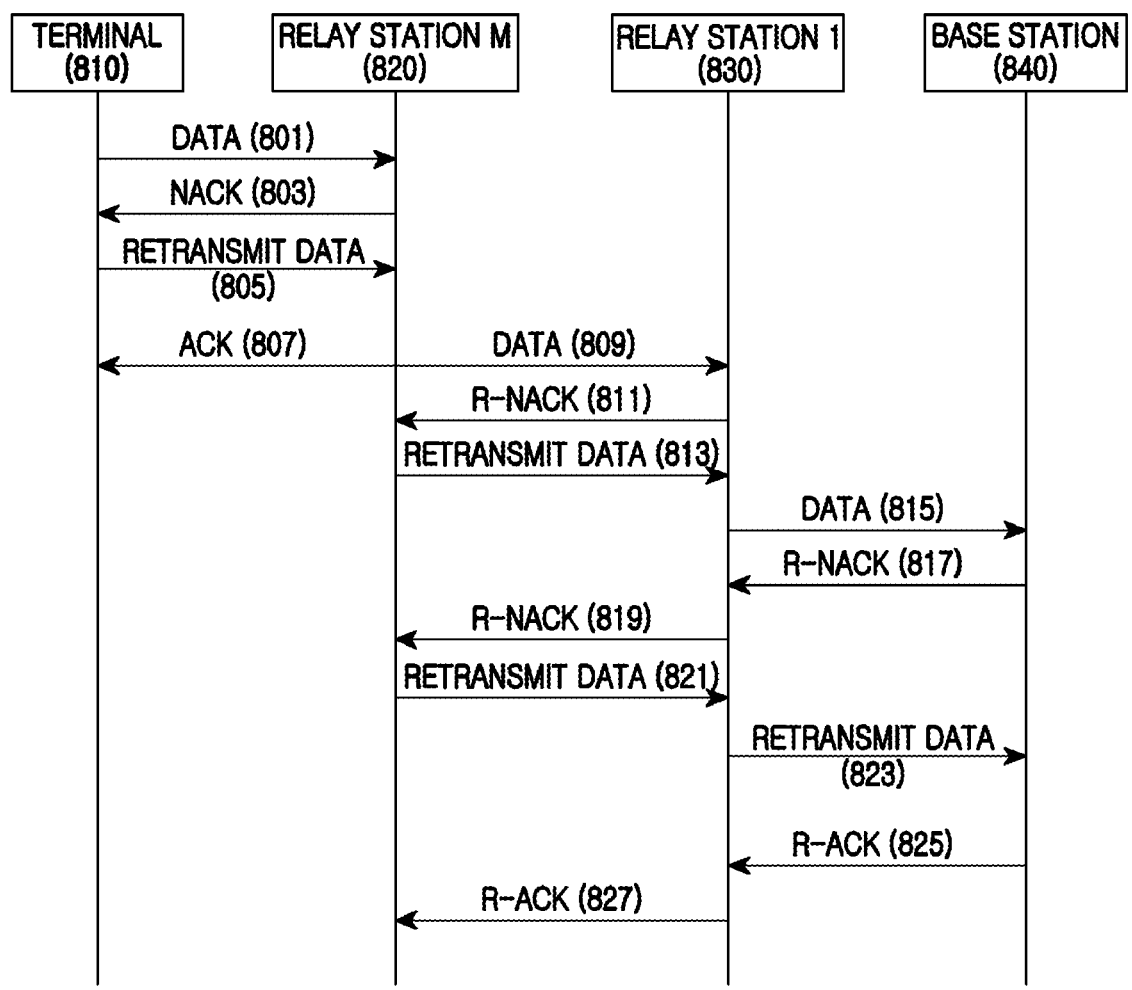
FIG. 8 illustrates information exchanges in a wireless relay communication system according to a third exemplary embodiment of the present invention.

FIG. 8 illustrates information exchanges in a wireless relay communication system according to a third exemplary embodiment of the present invention.

Referring to FIG. 8, the terminal 810 transmits data to the relay station M 820 in step 801. The relay station M 820, upon receiving the data, determines if there is an error. For example, the relay station M 820 determines if there is an error using CRC bits in a MAC PDU of the data. It is assumed that it has been determined that there is an error.

Upon determining that there is an error, the relay station M 820 sends a NACK to the terminal 810 in step 803. The terminal 810, upon receiving the NACK, retransmits the data to the relay station M 820 in step 805. The relay station M 820 determines if there is an error. At this time, it is assumed that it is determined that there is no error. That is, that the data is successfully received.

Upon determining that there is no error, the relay station M 820 sends an ACK to the terminal 810 in step 807. The relay station M 820, upon successfully receiving the data, relays the data to the relay station 1 830 in step 809. The relay station 1 830 determines if there is an error. It is assumed that the data is corrupted.

The relay station 1 830, upon determining that there is an error, sends an R-NACK to the relay station M 820 in step 811. The relay station M 820, upon receiving the R-NACK, retransmits the data to the relay station 1 830 in step 813. The relay station 1 830 determines if there is an error. It is assumed that the data is not corrupted. That is, that the data reception is successful.

Upon determining that there is no error, the relay station 1 830 relays the data to the base station 840 in step 815. The base station 840 determines if there is an error. At this time, it is assumed that it is determined that there is an error.

The base station 840, upon determining an error, sends an R-NACK to the relay station 1 830 in step 817. The relay station 1 830, upon receiving the R-NACK, relays the R-NACK to the relay station M 820 in step 819.

Upon receiving the R-NACK, the relay station M 820 determines that data reception at the base station 840 failed and operates to retransmit the data to the base station 840. That is, the relay station M 820 retransmits the data to the relay station 1 830 in step 821. When the relay station M 820 determines that the data reception at the relay station 1 840 was successful, the relay station M 820 sends a transmit instruction to retransmit the data, instead of the retransmitting the data.

The relay station 1 830, receiving the data or the transmit instruction, retransmits the data to the base station 840 in step 823. The base station 840 determines if there is an error. It is assumed that the data is free from error. That is, that the data reception is successful.

The base station 840, upon determining that there is no error, sends an R-ACK to the relay station 1 830 in step 825. Upon receiving the R-ACK, the relay station 1 830 forwards the R-ACK to the relay station M 820 in step 827.

Figure 9:
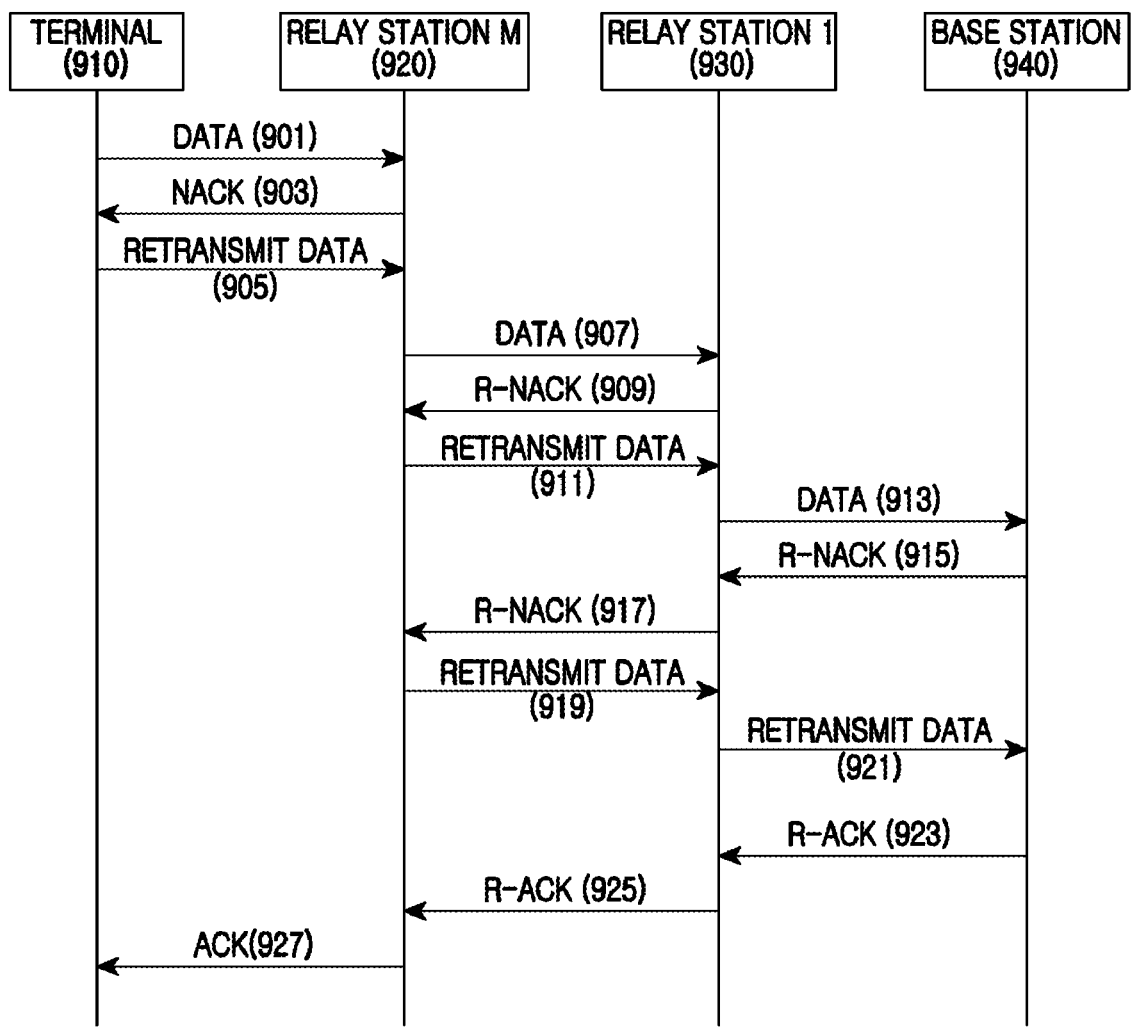
FIG. 9 illustrates information exchanges in a wireless relay communication system according to a fourth exemplary embodiment of the present invention.

FIG. 9 illustrates information exchanges in a wireless relay communication system according to a fourth exemplary embodiment of the present invention.

Referring to FIG. 9, the terminal 910 transmits data to the relay station M 920 in step 901. The relay station M 920 receiving the data determines if there is an error. For example, the relay station M 920 determines if there is an error using CRC bits in a MAC PDU of the data. It is assumed that it is determined that there is an error.

Upon determining that there is an error, the relay station M 920 sends a NACK to the terminal 910 in step 903. The terminal 910, upon receiving the NACK, retransmits the data to the relay station M 920 in step 905. The relay station M 920 determines if there is an error. At this time, it is assumed that the data is free from error. That is, that the data is successfully received.

Upon determining that there is no error, the relay station M 920 relays the data to the relay station 1 930 in step 907. The relay station 1 930 determines if there is an error. It is assumed that the data is corrupted.

The relay station 1 930, upon determining that there is an error, sends an R-NACK to the relay station M 920 in step 909. The relay station M 920, upon receiving the R-NACK, retransmits the data to the relay station 1 930 in step 911. The relay station 1 930 determines if there is an error. It is assumed that the data is not corrupted. That is, that the data reception is successful.

Upon determining that there is no error, the relay station 1 930 relays the data to the base station 940 in step 913. The base station 940 determines if there is an error. At this time, it is assumed that it is determined that there is an error.

The base station 940 determining that there is an error sends an R-NACK to the relay station 1 930 in step 915. The relay station 1 930, upon receiving the R-NACK, sends the R-NACK to the relay station M 920 in step 917.

Upon receiving the R-NACK, the relay station M 920 determines that the data reception of the base station 940 failed and operates to retransmit the data to the base station 940. That is, the relay station M 920 retransmits the data to the relay station 1 930 in step 919. When the relay station M 920 determines that the data reception of the relay station 1 930 is successful, the relay station M 920 sends transmit instructions to retransmit the data, instead of retransmitting the data.

The relay station 1 930, upon receiving the data or the transmit instructions, retransmits the data to the base station 940 in step 921. The base station 940 determines if there is an error. It is assumed that it was determined that there is no error. That is, that the data reception is successful.

The base station 940, upon determining that there is no error, sends an R-ACK to the relay station 1 930 in step 923. Upon receiving the R-ACK, the relay station 1 930 forwards the R-ACK to the relay station M 920 in step 925. Upon receiving the R-ACK, the relay station M 920 determines that the data reception of the base station 940 is successful and sends an ACK to the terminal 910 in step 927.

In the third or fourth embodiment of FIGS. 8 and 9, the relay station that is not directly communicating with the terminal, that is, the relay station 1, determines if there is an error according to the ARQ of the MAC layer and sends only the R-NACK. In various exemplary embodiments of the present invention, the relay station 1 can send the R-ACK as well as the R-NACK. Hence, the case where the relay station 1 is able to send both the R-NACK and the R-ACK is illustrated.

Figure 10:
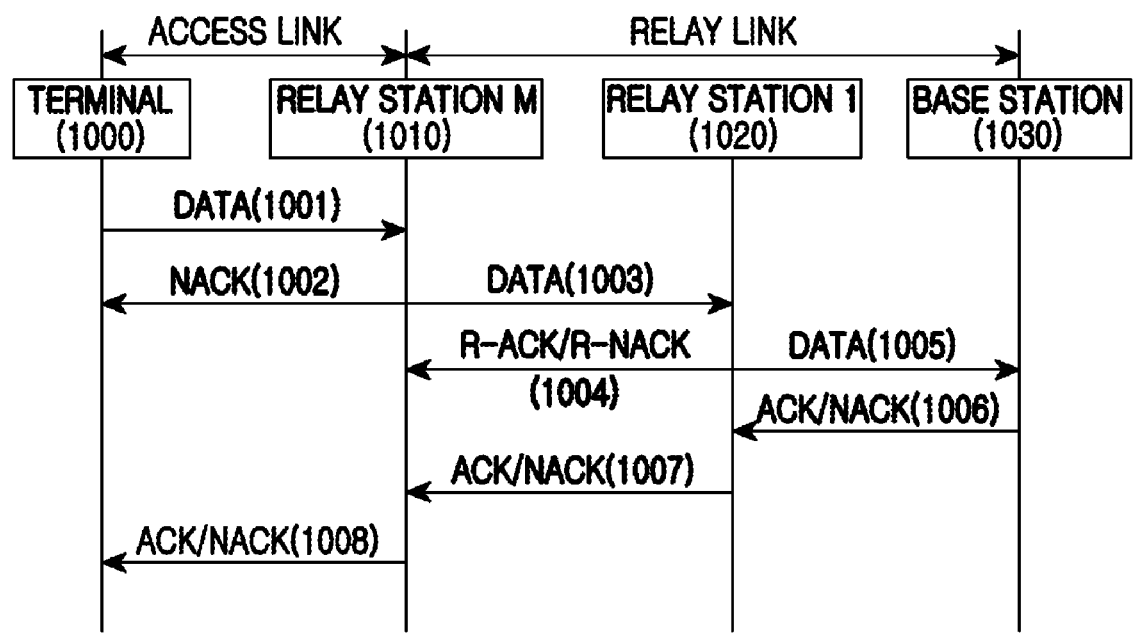
FIG. 10 illustrates information exchangeable in links on an uplink communication in a wireless relay communication system according to fifth and sixth exemplary embodiments of the present invention.

FIG. 10 illustrates information exchangeable over links in an uplink communication in a wireless relay communication system according to fifth and sixth exemplary embodiments of the present invention.

Referring to FIG. 10, a terminal 1000 transmits data to a relay station M 1010 in step 1001. The relay station M 1010, in step 1002, may transmit a NACK indicative of its reception failure to the terminal 1000. Herein, the NACK indicative of the reception failure of the relay station M 1010 may be omitted if the relay station M 1010 successfully receives the data. Once the data is successfully received at the relay station M 1010, the relay station M 1010 relays the data to the relay station 1 1020 in step 1003, and the relay station 1 1020 sends an R-ACK/R-NACK indicative of its reception success/failure to the relay station M 1010 in step 1004. The R-ACK/R-NACK indicative of the reception success/failure of the relay station 1 1020 may be omitted. The relay station 1 1020 relays the data to the base station 1030 in step 1005, and the base station 1030 sends an ACK/NACK indicative of it reception success/failure to the relay station 1 1020 in step 1006. The ACK/NACK indicative of the reception success/failure of the base station 1030 is transmitted from the relay station 1 1020 to the relay station M 1010 in step 1007 and then to the terminal 1000 in step 1008.

The fifth and sixth exemplary embodiments of the present invention differ by which node commences the data retransmission to the base station 1030 when there is a data reception failure of the base station 1030. In the fifth exemplary embodiment, the relay station M 1010 commences the data retransmission to the base station 1030. In the sixth embodiment, the relay station 1 1020 commences the data retransmission to the base station 1030. In more detail, in the fifth embodiment, the NACK of the base station 1030 is received at the relay station M 1010 via the relay station 1 1020 and the relay station M 1010 receiving the NACK retransmits the data. In the sixth embodiment of the present invention, the NACK of the base station 1030 is not delivered to the relay station M 1010 and the relay station 1 1020 receiving the NACK retransmits the data. In the sixth embodiment, the relay station M 1010 does not receive the NACK.

Now, information exchanges according to an ARQ of a MAC layer in a wireless relay communication system according to the fifth and sixth exemplary embodiments of the present invention are described.

Figure 11:
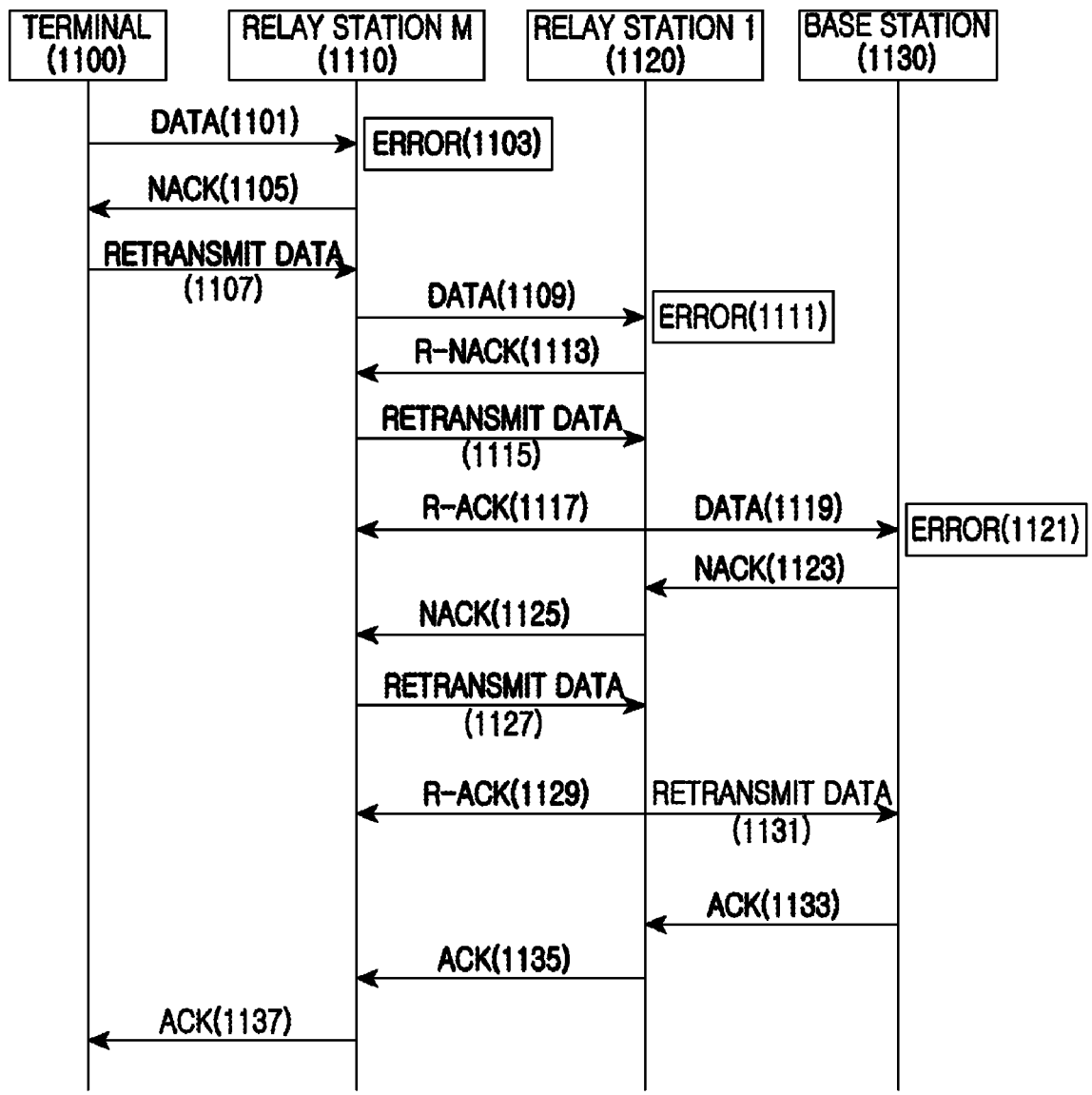
FIG. 11 illustrates information exchanges in a wireless relay communication system according to the fifth exemplary embodiment of the present invention.

FIG. 11 illustrates information exchanges in a wireless relay communication system according to the fifth exemplary embodiment of the present invention.

Referring to FIG. 11, the terminal 1100 transmits data to the relay station M 1110 in step 1101. The relay station M 1110 determines if there is an error by determining whether the data is successfully received in step 1103 and sends a NACK indicative of its data reception failure to the terminal 1100 in step 1105. Next, the relay station M 1110 receives the data retransmitted from the terminal 1100 in step 1107 and relays the successfully received data to the relay station 1 1120 according to the data reception success in step 1109.

The relay station 1 1120 determines if there is an error by determining whether the data is successfully received in step 1111 and sends an R-NACK indicative of the data reception failure to the relay station M 1110 in step 1113. After receiving the data retransmitted from the relay station M 1110 in step 1115, the relay station 1 1120 sends an R-ACK indicative of the data reception success to the relay station M 1110 in step 1117 and relays the data to the base station 1130 in step 1119.

The base station 1130 determines if there is an error by determining whether the data reception is successful in step 1121 and sends a NACK indicative of the data reception failure to the relay station 1 1120 in step 1123. The relay station 1 1120 relays the NACK to the relay station M 1110 in step 1125 and receives the retransmitted data from the relay station M 1110 in step 1127. The relay station 1 1120 can receive the retransmit instructions for the data retransmission, instead of receiving the retransmitted data. Next, the relay station 1 120 sends an R-ACK to the relay station M 1110 according to the successful data reception in step 1129 and retransmits the data to the base station 1130 in step 1131.

The base station 1130 confirms the successful data reception by determining the data reception success or data reception failure and sends an ACK of the data to the relay station 1 1120 in step 1133. Hence, the relay station 1 1120 relays the ACK to the relay station M 1110 in step 1135. Likewise, the relay station M 1110 relays the ACK to the terminal 1100 in step 1137.

Figure 12:
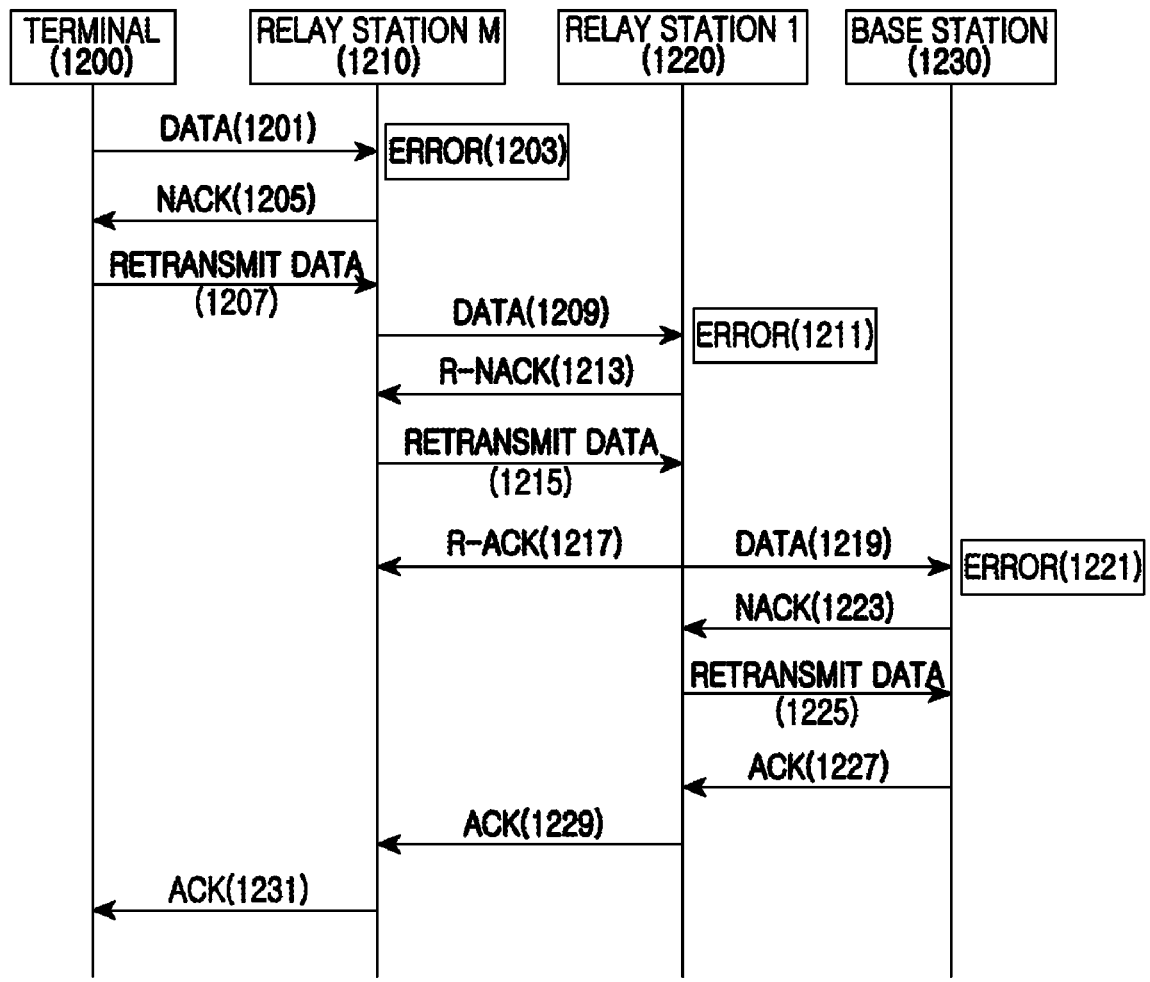
FIG. 12 illustrates information exchanges in a wireless relay communication system according to the sixth exemplary embodiment of the present invention.

FIG. 12 illustrates information exchanges in a wireless relay communication system according to the sixth exemplary embodiment of the present invention.

Referring to FIG. 12, the terminal 1200 transmits data to the relay station M 1210 in step 1201. The relay station M 1210 determines if there is an error by determining whether the data is successfully received in step 1203 and sends a NACK indicative of the data reception failure to the terminal 1200 in step 1205. Next, the relay station M 1210 receives the data retransmitted from the terminal 1200 in step 1207 and relays the successfully received data to the relay station 1 1220 according to the data reception success in step 1209.

The relay station 1 1220 determines if there is an error by determining whether the data is successfully received in step 1211 and sends an R-NACK indicative of the data reception failure to the relay station M 1210 in step 1213. After receiving the data retransmitted from the relay station M 1210 in step 1215, the relay station 1 1220 sends an R-ACK indicative of the data reception success to the relay station M 1210 in step 1217 and relays the data to the base station 1230 in step 1219. In so doing, the relay station 1 1220 may not send the R-ACK in step 1217.

The base station 1230 determines if there is an error by determining whether the data reception is successful in step 1221 and sends a NACK indicative of the data reception failure to the relay station 1 1220 in step 1223. Hence, the relay station 1 1220 retransmits the data to the base station 1230 in step 1225.

The base station 1230 confirms successful data reception by determining the data reception success or data reception failure and sends an ACK of the data reception success to the relay station 1 1220 in step 1227. The relay station 1 1220 relays the ACK to the relay station M 1210 in step 1229. Likewise, the relay station M 1210 relays the ACK to the terminal 1200 in step 1231.

Figure 13:
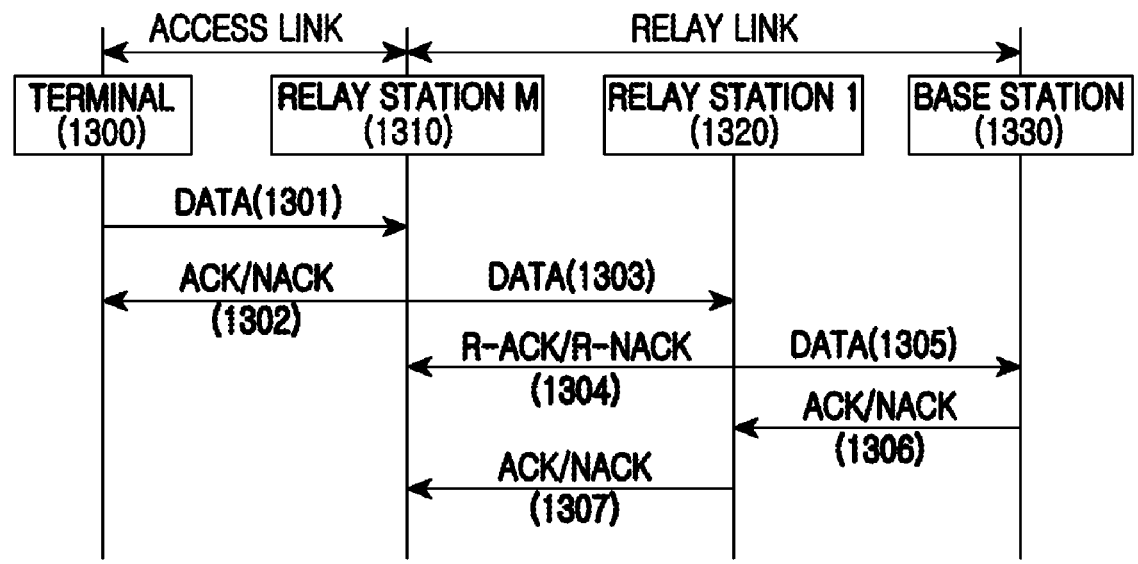
FIG. 13 illustrates information exchangeable in links on an uplink communication in a wireless relay communication system according to seventh and eighth exemplary embodiments of the present invention.

FIG. 13 illustrates information exchangeable over links in an uplink communication in a wireless relay communication system according to seventh and eighth exemplary embodiments of the present invention.

Referring to FIG. 13, the terminal 1300 transmits data to the relay station M 1310 in step 1301. The relay station M 1310 sends an ACK/NACK indicative of its reception success/failure to the terminal 1300 in step 1302. The relay station M 1310 relays the data to the relay station 1 1320 in step 1303, and the relay station 1 1320 sends an R-ACK/R-NACK indicative of its reception success/failure to the relay station M 1310 in step 1304. The R-ACK/R-NACK indicative of the reception success/failure of the relay station 1 1320 may be omitted. The relay station 1 1320 relays the data to the base station 1330 in step 1305, and the base station 1330 sends an ACK/NACK indicative of it reception success/failure to the relay station 1 1320 in step 1306. The ACK/NACK indicative of the reception success/failure of the base station 1330 is forwarded from the relay station 1 1320 to the relay station M 1310 in step 1307.

The seventh and eighth exemplary embodiments of the present invention are differentiated by the node that commences the data retransmission to the base station 1330 when there is a data reception failure of the base station 1330. In the seventh exemplary embodiment, the relay station M 1310 commences the data retransmission to the base station 1330. In the eighth exemplary embodiment, the relay station 1 1320 commences the data retransmission to the base station 1330. In more detail, in the seventh exemplary embodiment, the NACK of the base station 1330 is received at the relay station M 1310 via the relay station 1 1320 and the relay station M 1310 receiving the NACK retransmits the data. In the eighth exemplary embodiment of the present invention, the NACK of the base station 1330 is not sent to the relay station M 1310 and the relay station 1 1320 receiving the NACK retransmits the data. In the eighth embodiment, the relay station M 1310 does not receive the NACK.

Now, information exchanges according to an ARQ of a MAC layer in a wireless relay communication system according to the seventh and eighth exemplary embodiments of the present invention are described.

Figure 14:
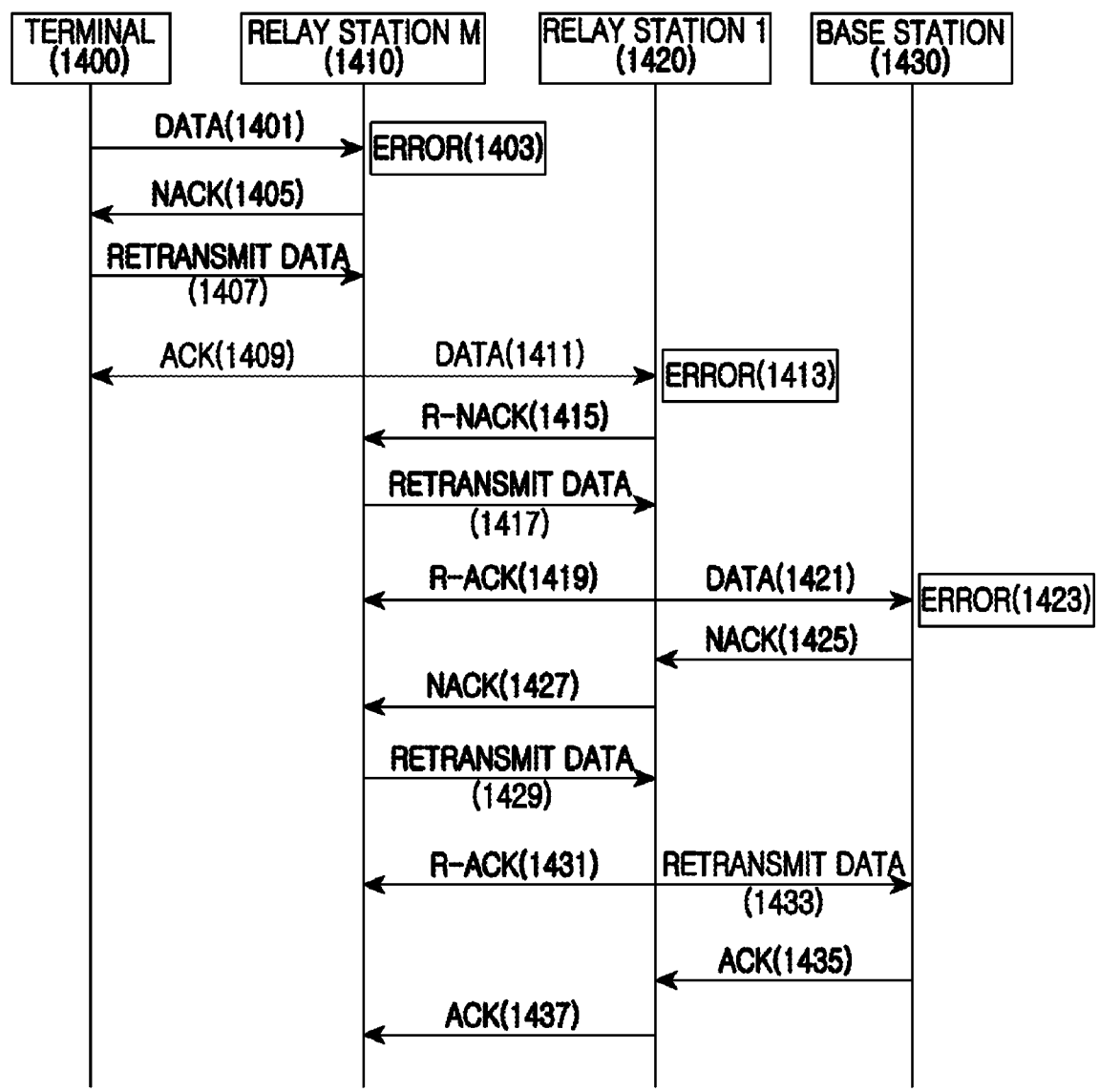
FIG. 14 illustrates information exchanges in a wireless relay communication system according to the seventh exemplary embodiment of the present invention.

FIG. 14 illustrates information exchanges in a wireless relay communication system according to the seventh exemplary embodiment of the present invention.

Referring to FIG. 14, the terminal 1400 transmits data to the relay station M 1410 in step 1401. The relay station M 1410 determines if there is an error by determining whether the data is successfully received in step 1403 and sends a NACK indicative of the data reception failure to the terminal 1400 in step 1405. Next, the relay station M 1410 receives the data retransmitted from the terminal 1400 in step 1407, sends an ACK to the terminal 1400 according to the successful data reception in step 1409, and relays the data to the relay station 1 1420 in step 1411.

The relay station 1 1420 determines if there is an error by determining whether the data reception is successful in step 1413 and sends an R-NACK indicative of the data reception failure to the relay station M 1410 in step 1415. The relay station 1 1420 receives the data retransmitted from the relay station M 1410 in step 1417, sends an R-ACK indicative of the data reception success to the relay station M 1410 according to the successful data reception in step 1419, and relays the data to the base station 1430 in step 1421.

The base station 1430 determines if there is an error by determining whether the data reception is successful in step 1423 and sends a NACK indicative of the data reception failure to the relay station 1 1420 in step 1425. The relay station 1 1420 relays the NACK to the relay station M 1410 in step 1427 and receives the retransmitted data from the relay station M 1410 in step 1429. The relay station 1 1420 may receive the retransmit instruction for the data retransmission, instead of receiving the retransmitted data. Next, the relay station 1 1420 sends an R-ACK to the relay station M 1410 according to the successful data reception in step 1431 and retransmits the data to the base station 1430 in step 1433.

The base station 1430 confirms the successful data reception by determining the data reception success or data reception failure and sends an ACK of the data to the relay station 1 1420 in step 1435. Next, the relay station 1 1420 relays the ACK to the relay station M 1410 in step 1437.

Figure 15:
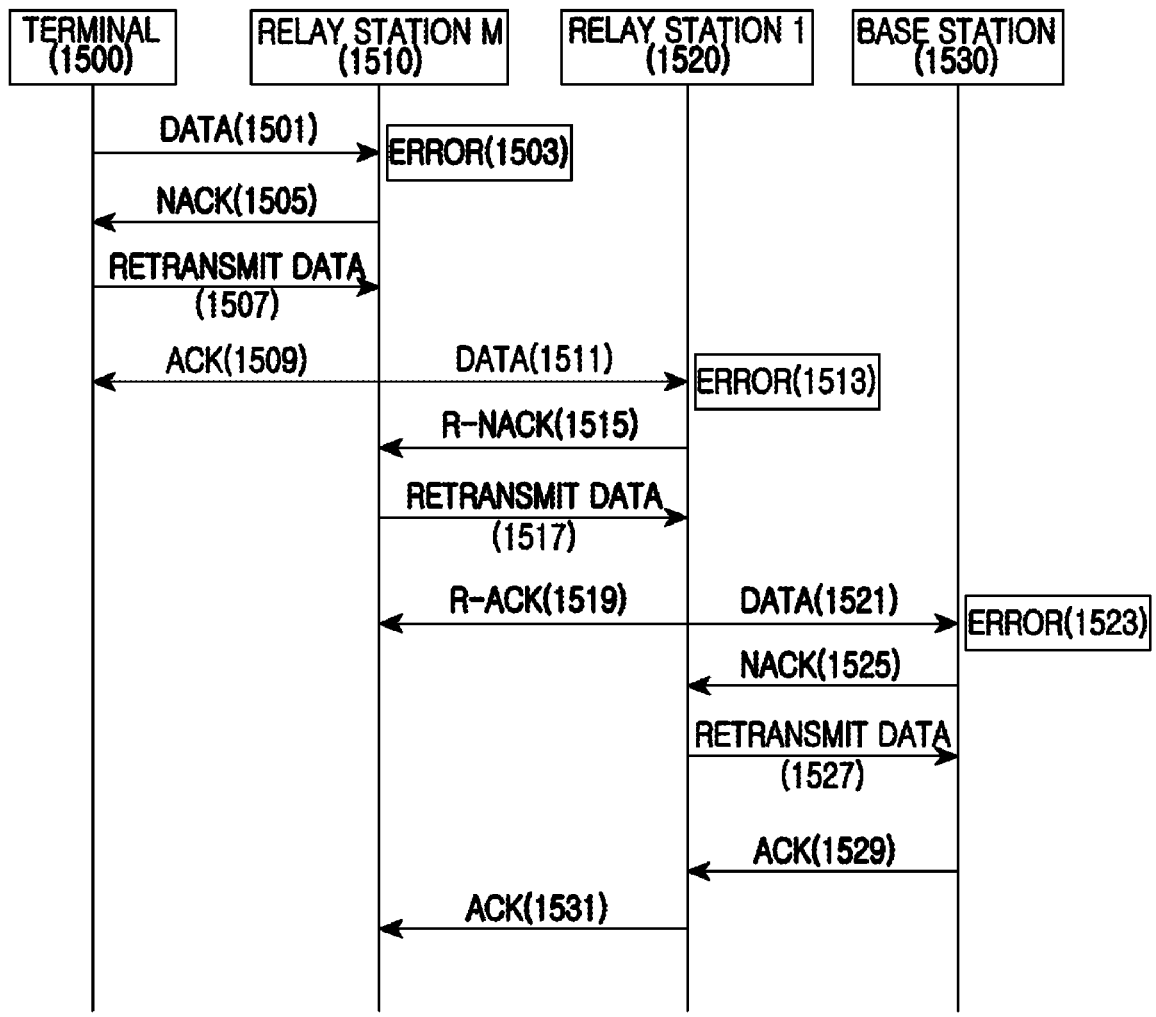
FIG. 15 illustrates information exchanges in a wireless relay communication system according to the eighth exemplary embodiment of the present invention.

FIG. 15 illustrates information exchanges in a wireless relay communication system according to the eighth exemplary embodiment of the present invention.

Referring to FIG. 15, the terminal 1500 transmits data to the relay station M 1510 in step 1501. The relay station M 1510 determines if there is an error by determining whether the data is successfully received in step 1503 and sends a NACK indicative of the data reception failure to the terminal 1500 in step 1505. Next, the relay station M 1510 receives the data retransmitted from the terminal 1500 in step 1507, sends an ACK of the data to the terminal 1500 according to the successful data reception in step 1509, and relays the data to the relay station 1 1520 in step 1511.

The relay station 1 1520 determines if there is an error by determining whether the data reception is successful in step 1513 and sends an R-NACK indicative of the data reception failure to the relay station M 1510 in step 1515. The relay station 1 1520 receives the data retransmitted from the relay station M 1510 in step 1517, sends an R-ACK indicative of the data reception success to the relay station M 1510 according to the successful data reception in step 1519, and relays the data to the base station 1530 in step 1521. The transmission of the R-ACK in step 1519 may be omitted.

The base station 1530 determines if there is an error by determining whether the data reception is successful in step 1523 and sends a NACK indicative of the data reception failure to the relay station 1 1520 in step 1525. Hence, the relay station 1 1520 retransmits the data to the base station 1530 in step 1527.

The base station 1530 confirms the successful data reception by determining the data reception success or data reception failure and sends an ACK of the data to the relay station 1 1520 in step 1529. Next, the relay station 1 1520 relays the ACK to the relay station M 1510 in step 1531.

Now, the operations of the relay station for an ARQ of a MAC layer according to the fifth and sixth exemplary embodiments of the present invention are described.

Figure 16:
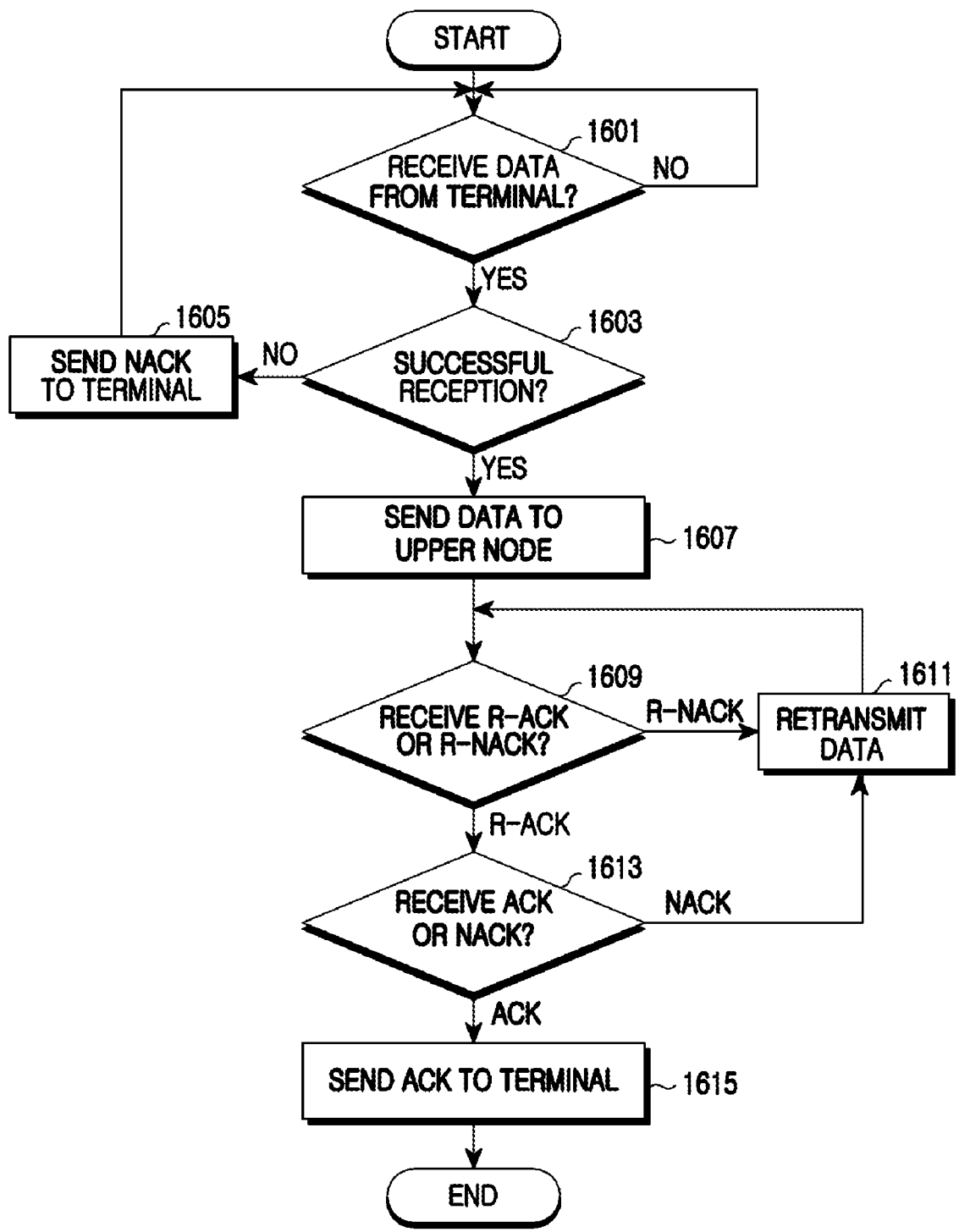
FIG. 16 illustrates an uplink communication process of a relay station connected to a terminal in a wireless relay communication system according to the fifth exemplary embodiment of the present invention.

FIG. 16 is a flowchart outlining the uplink communication process of the relay station M in the wireless relay communication system according to the fifth exemplary embodiment of the present invention.

Referring to FIG. 16, in step 1601, the relay station M determines whether data is received from the terminal. When receiving the data, the relay station M determines whether the data reception is successful through the CRC of the data in step 1603. Herein, when it is determined that there is an error, the relay station M can determine the data reception failure. When it is determined that there is no error, the relay station M can determine the data reception success.

When it is determined that the data reception fails, the relay station M sends a NACK of the data to the terminal in step 1605, returns to step 1601 to receive the retransmitted data, and then repeats the subsequent steps. In contrast, when it is determined that the data reception is successful, the relay station M relays the successfully received data to its upper node in step 1607 and determines whether an R-ACK or an R-NACK is received from the upper node in step 1609.

If an R-NACK is received, the relay station M retransmits the data to the upper node in step 1611, returns to step 1609, and repeats the subsequent steps. If an R-ACK is received, the relay station M determines whether an ACK or a NACK is received from the upper node in step 1613. If a NACK is received, the relay station M retransmits the data to the upper node in step 1611 and repeats the subsequent steps. In contrast, if an ACK is received, the relay station M relays the received ACK to the terminal in step 1615.

In the operations of the relay station M of FIG. 16, the operations according to an ARQ timer have been omitted for brevity. When the ARQ timer is employed, the relay station M forwards the data to the upper node and then operates the ARQ timer. If the ARQ timer expires before the R-ACK is received, the relay station M determines that the final data reception failed and finishes the ARQ process in the relay link.

Figure 17:
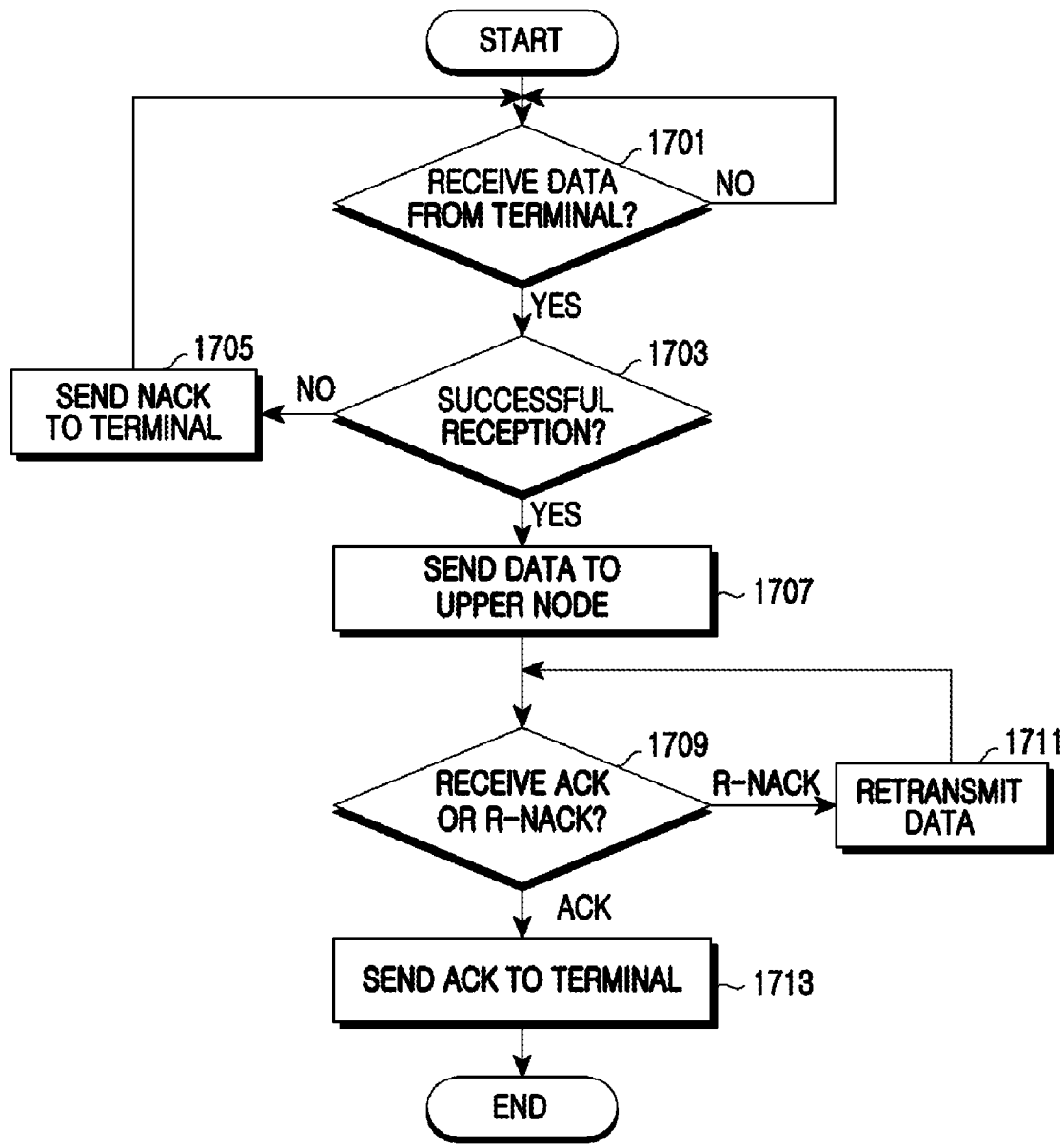
FIG. 17 illustrates an uplink communication process of a relay station connected to a terminal in a wireless relay communication system according to the sixth exemplary embodiment of the present invention.

FIG. 17 is a flowchart outlining an uplink communication process of a relay station M in a wireless relay communication system according to the sixth exemplary embodiment of the present invention.

Referring to FIG. 17, steps 1701 through 1707 of FIG. 17 are substantially the same as the steps 1601 through 1607 of FIG. 16 and therefore their description shall be omitted for conciseness.

After step 1707, the relay station M determines whether an ACK or an R-NACK is received from the upper node in step 1709. Herein, the R-NACK indicates the data reception failure of the upper node and the ACK indicates the data reception success of the base station. Upon receiving the R-NACK, the relay station M retransmits the data to the upper node in step 1711, returns to step 1709, and repeats the subsequent steps. Upon receiving the ACK, the relay station M relays the received ACK to the terminal in step 1713.

In the operations of the relay station M of FIG. 17, the operations according to the ARQ timer have been omitted for brevity. When the ARQ timer is employed, the relay station M forwards the data to the upper node and then operates the ARQ timer. When the ARQ timer expires before the ACK is received, the relay station M determines the failure of the final data reception and finishes the ARQ process in the relay link.

Figure 18:
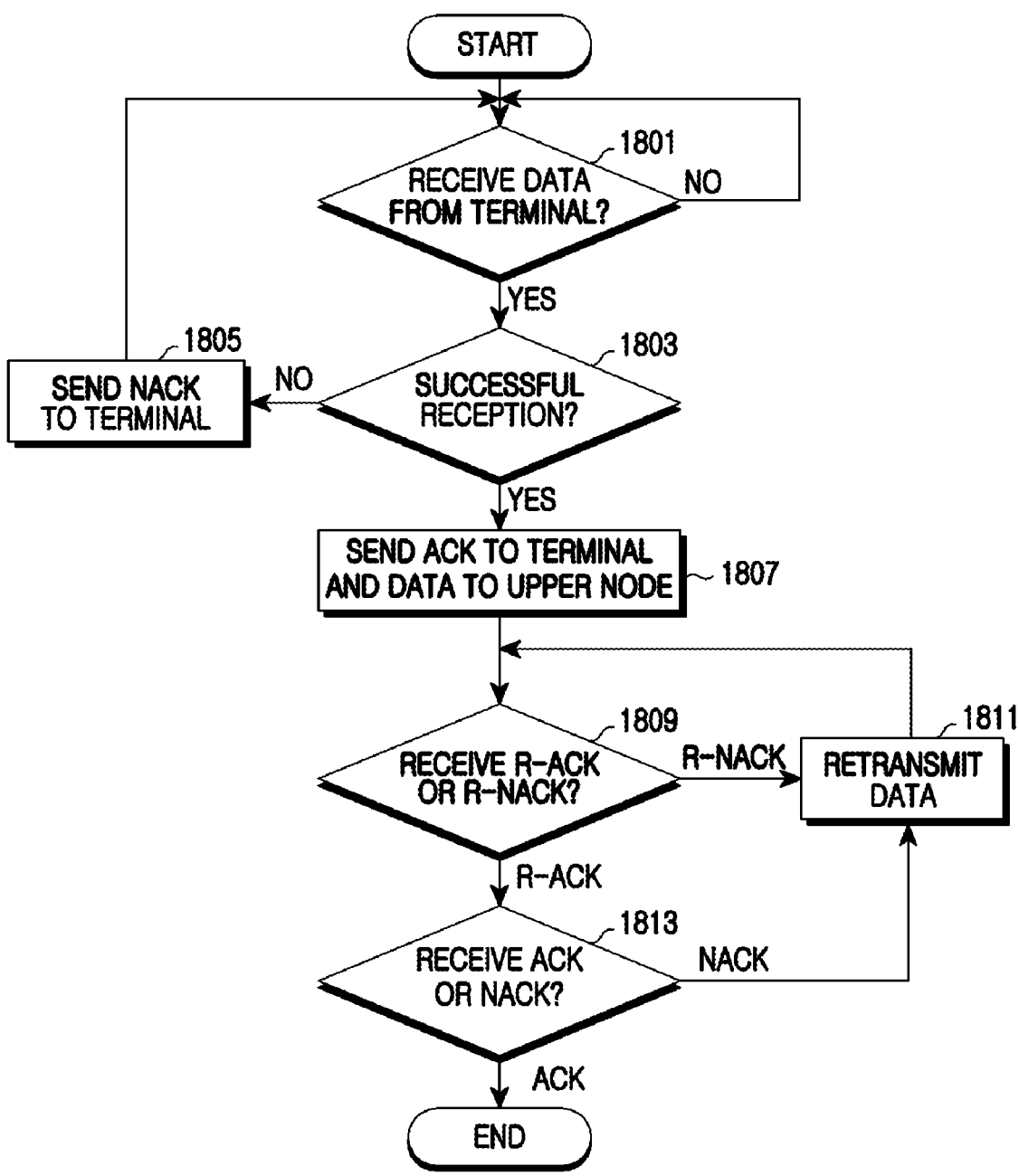
FIG. 18 illustrates an uplink communication process of a relay station connected to a terminal in a wireless relay communication system according to the seventh exemplary embodiment of the present invention.

FIG. 18 is a flowchart outlining an uplink communication process of a relay station M in a wireless relay communication system according to the seventh exemplary embodiment of the present invention.

Referring to FIG. 18, in step 1801, the relay station M determines whether data is received from the terminal. When receiving the data, the relay station M determines whether the data reception is successful through the CRC of the data in step 1803. Herein, when it is determined that there is an error, the relay station M can determine that data reception failed. When it is determined that there is an error, the relay station M can determine that data reception is successful.

If it is determined that data reception failed, the relay station M sends a NACK to the terminal in step 1805, returns to step 1801 to receive the retransmitted data from the terminal, and then repeats the subsequent steps. In contrast, when it is determined that data reception was successful, the relay station M sends an ACK to the terminal and relays the successfully received data to its upper node in step 1807.

In step 1809, the relay station M determines whether an R-ACK or an R-NACK is received from the upper node. Herein, the R-NACK indicates the data reception failure of the upper node and the R-ACK indicates the data reception success of the base station. Upon receiving the R-NACK, the relay station M retransmits the data to the upper node in step 1811, returns to step 1809, and repeats the subsequent steps. Upon receiving the R-ACK, the relay station M determines whether an ACK or a NACK is received in step 1813. Upon receiving the ACK, the relay station M finishes the process. Upon receiving the NACK, the relay station M returns to step 1811.

In the operations of the relay station M of FIG. 18, the operations according to an ARQ timer have been omitted for brevity. When the ARQ timer is employed, the relay station M forwards the data to the upper node and then operates the ARQ timer. If the ARQ timer expires before the ACK is received, the relay station M determines that final data reception failed and finishes the ARQ process in the relay link.

Figure 19:
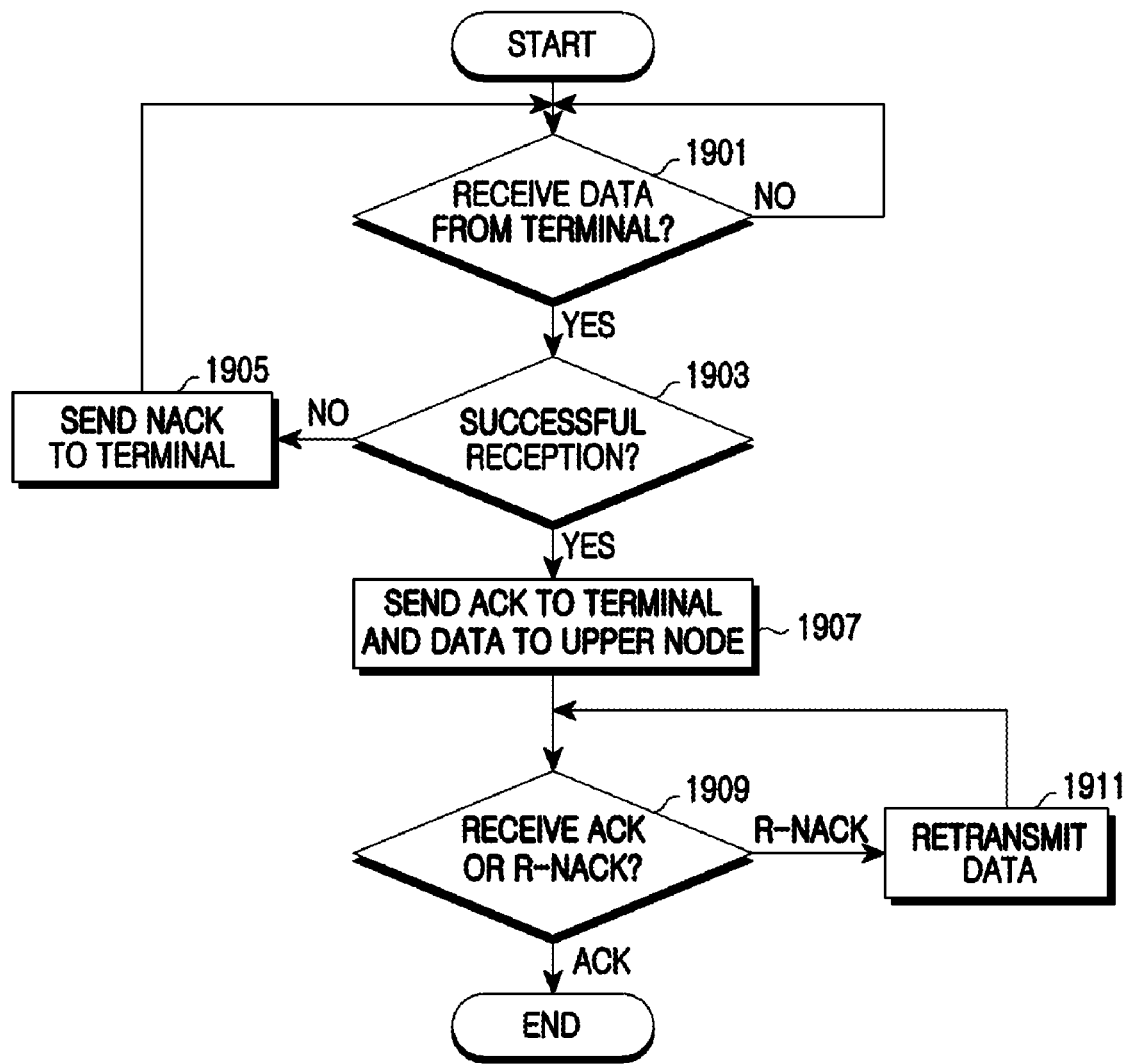
FIG. 19 illustrates an uplink communication process of a relay station connected to a terminal in a wireless relay communication system according to the eighth exemplary embodiment of the present invention.

FIG. 19 is a flowchart outlining an uplink communication process of a relay station M in a wireless relay communication system according to the eighth exemplary embodiment of the present invention.

Referring to FIG. 19, in step 1901, the relay station M determines whether data is received from the terminal. When receiving the data, the relay station M determines whether the data reception is successful through the CRC of the data in step 1903. Herein, when it is determined that there is an error, the relay station M can determine that data reception failed. When it is determined that there is an error, the relay station M can determine the data reception is successful.

If it is determined that data reception failed, the relay station M sends a NACK of the data to the terminal in step 1905, returns to step 1901 to receive the retransmitted data, and then repeats the subsequent steps. In contrast, if it is determined that data reception is successful, the relay station M sends an ACK to the terminal and relays the successfully received data to its upper node in step 1907.

In step 1909, the relay station M determines whether an ACK or an R-NACK is received from the upper node. Herein, the R-NACK indicates data reception failure of the upper node and the ACK indicates data reception success of the base station. If an ACK is received, the relay station M finishes the process. If an R-NACK is received, the relay station M retransmits the data to the upper node in step 1911 and returns to step 1909.

In the operations of the relay station M of FIG. 19, the operations according to an ARQ timer have been omitted for brevity. When the ARQ timer is employed, the relay station M forwards the data to the upper node and then operates the ARQ timer. If the ARQ timer expires before the ACK is received, the relay station M determines that the final data reception failed and finishes the ARQ process in the relay link.

Figure 20:
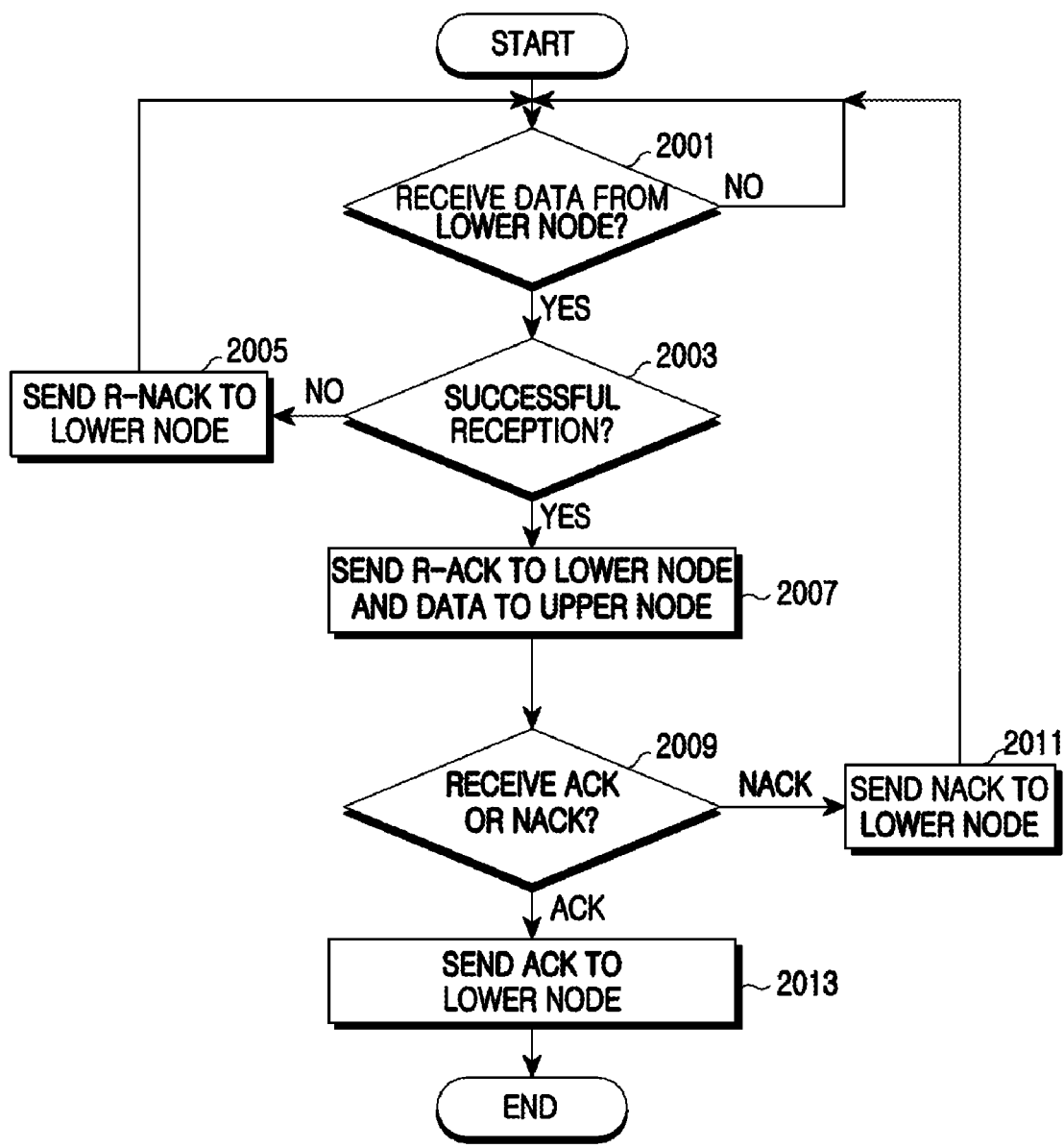
FIG. 20 illustrates an uplink communication process of a relay station connected to a base station in a wireless relay communication system according to the fifth or seventh exemplary embodiment of the present invention.

FIG. 20 is a flowchart outlining an uplink communication process of a relay station 1 in a wireless relay communication system according to the fifth and seventh exemplary embodiments of the present invention.

Referring to FIG. 20, in step 2001, the relay station 1 determines whether data is received from its lower node. When receiving data, the relay station 1 determines whether the data reception is successful through the CRC of the data in step 2003.

If it is determined that the data reception failed, the relay station 1 sends an R-NACK of the data to the lower node in step 2005, receives the data retransmitted from the lower node back in step 2001, and then repeats the subsequent steps. In contrast, if it is determined that data reception is successful, the relay station 1 sends an R-ACK indicative of the data reception success to the lower node and relays the successfully received data to its upper node in step 2007.

In step 2009, the relay station 1 determines whether an ACK or a NACK is received from the upper node. If the NACK is received, the relay station 1 sends the NACK to the lower node in step 2011, returns to step 2001 to receive the retransmitted data, and repeats the subsequent steps. In contrast, if the ACK is received, the relay station 1 sends the ACK to the lower node in step 2013.

In the operations of the relay station 1 of FIG. 20, the operations according to an ARQ timer have been omitted for brevity. When the ARQ timer is employed, the relay station 1 forwards the data to the upper node and then operates the ARQ timer. If the ARQ timer expires before an ACK is received, the relay station 1 determines that the final data reception failed and finishes the ARQ process in the relay link.

Figure 21:
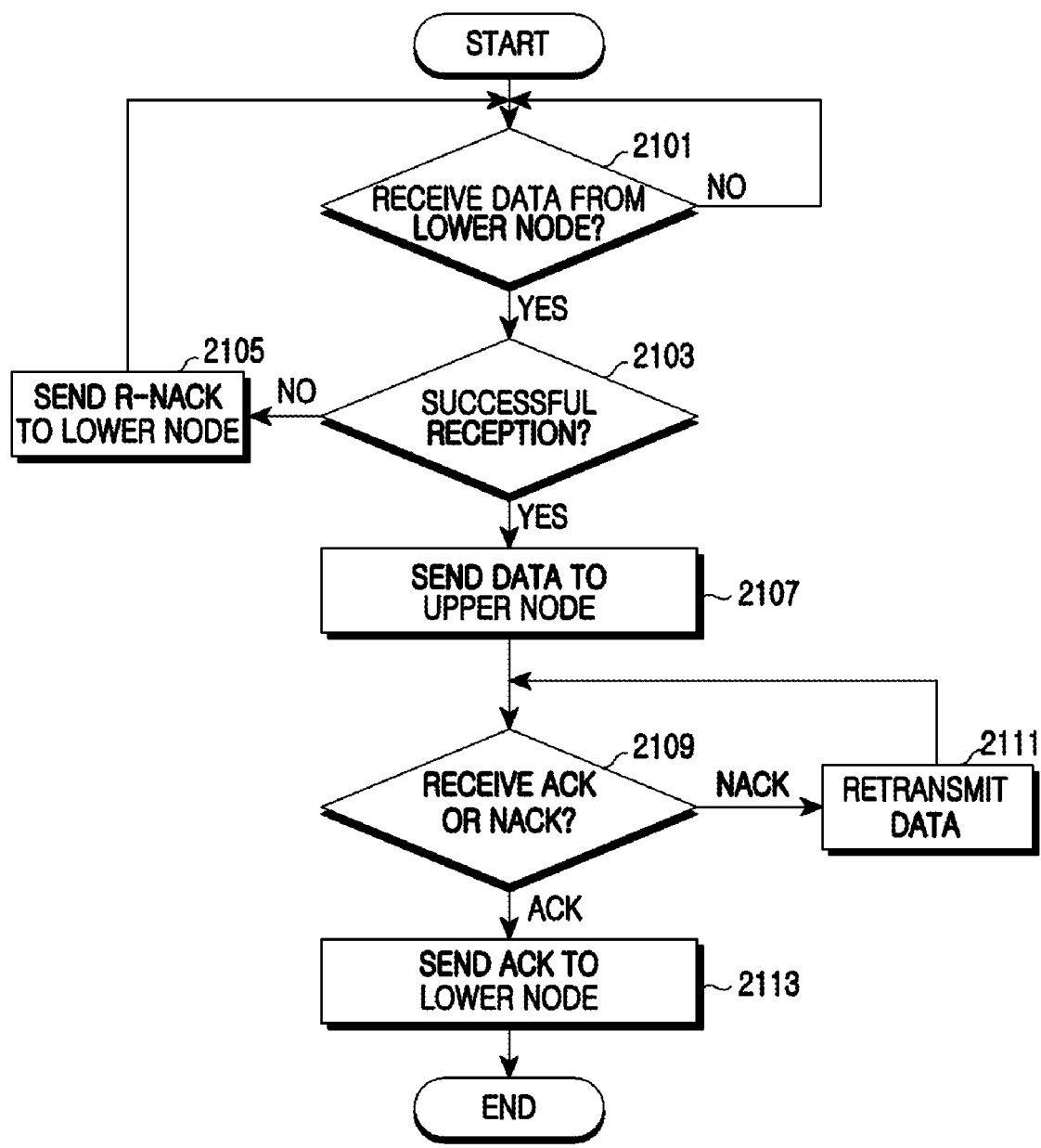
FIG. 21 illustrates an uplink communication process of a relay station connected to a base station in a wireless relay communication system according to the sixth and eighth exemplary embodiments of the present invention.

FIG. 21 is a flowchart outlining an uplink communication process of a relay station 1 in a wireless relay communication system according to the sixth and eighth exemplary embodiments of the present invention.

Referring to FIG. 21, steps 2101 through 2105 of FIG. 21 are substantially the same as steps 2001 through 2005 of FIG. 20 and their descriptions shall be omitted for conciseness.

When determining that data reception from the lower node in step 2103 is successful, the relay station 1 relays the data to the upper node in step 2107.

In step 2109, the relay station 1 determines whether an ACK or a NACK is received from the upper node. If a NACK is received, the relay station 1 retransmits the data to the upper node in step 2111, returns to step 2109, and repeats the subsequent steps. In contrast, when receiving if an ACK is received, the relay station 1 sends the ACK to the lower node in step 2113.

In the operations of the relay station 1 of FIG. 21, the operations according to an ARQ timer have been omitted for brevity. When the ARQ timer is employed, the relay station 1 forwards the data to the upper node and then operates the ARQ timer. If the ARQ timer expires before the ACK is received, the relay station 1 determines that the final data reception failed and finishes the ARQ process in the relay link.

Figure 22:
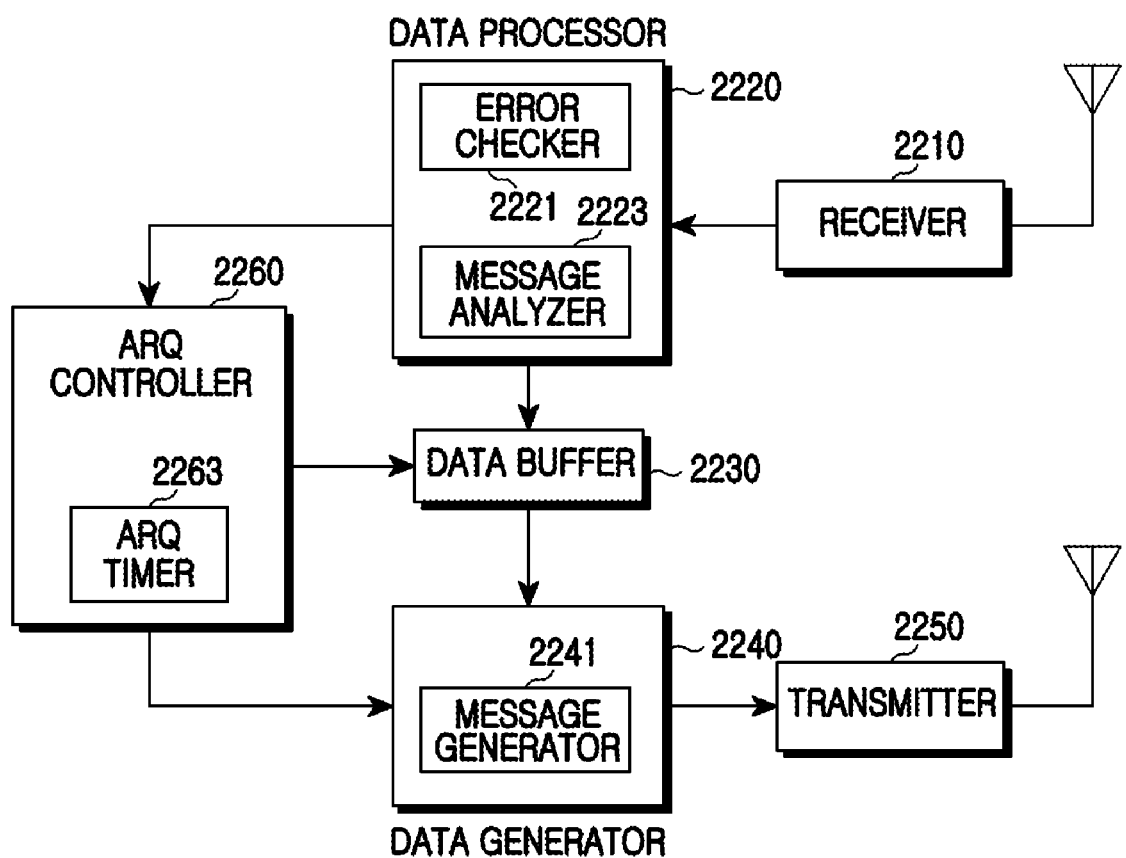
FIG. 22 illustrates a relay station in a wireless relay communication system according to an exemplary embodiment of the present invention.

FIG. 22 is a block diagram of a relay station in a wireless relay communication system according to an exemplary embodiment of the present invention.

Referring to FIG. 22, the relay station M of FIG. 22 includes a receiver 2210, a data processor 2220, an ARQ controller 2260, a data buffer 2230, a data generator 2240, and a transmitter 2250.

The receiver 2210 restores the signal received via an antenna to an information bit stream and provides the information bit stream to the data processor 2220. For example, the receiver 2210 restores the information bit stream by converting a Radio Frequency (RF) signal received over the antenna into a baseband signal, and demodulating and decoding the baseband signal. According to an Orthogonal Frequency Division Multiplexing (OFDM) scheme, the receiver 2210 converts the baseband signal into subcarrier signals through Fast Fourier Transform (FFT), and demodulates and decodes the converted signals.

The data processor 2220 decomposes the information bit stream output from the receiver 2210 into data and a control message and processes the data and the control message according to their corresponding process. The data processor 2220 provides the data received from the lower node to the data buffer 2230. More specifically, an error checker 2221 of the data processor 2220 determines if there is an error in the data received from the lower node. For example, the error checker 2221 determines if there is an error through the CRC on the CRC bits in the data. The error checker 2221 informs the ARQ controller 2260 of the results of its determination. A message analyzer 2223 of the data processor 2220 analyzes the control message received from the base station and thus determines whether an ACK, a NACK, an R-ACK, or an R-NACK is received from the upper node. The message analyzer 2223 informs the ARQ controller 2260 of the reception of the ACK, the NACK, the R-ACK, or the R-NACK.

The data buffer 2230 temporarily stores the received data. The data buffer 2230 outputs the stored data to the data generator 2240 or deletes the stored data under the control of the ARQ controller 2260. In more detail, when the ARQ controller 2260 informs of the data reception success of the upper node, the data buffer 2230 deletes the corresponding data. The data generator 2240 generates the bit stream to be transmitted. More particularly, a message generator 2241 of the data generator 2240 generates an ACK, a NACK, an R-ACK, or an R-NACK to be sent to the lower node under the control of the ARQ controller 2260. The data generator 2240 constitutes the data fed from the data buffer 2230 in a transmission unit of the physical layer and provides the data to the transmitter 2250.

The transmitter 2250 converts the information bit stream output from the data generator 2240 into a physical signal and transmits the physical signal over the antenna. For example, the transmitter 2250 converts the information bit stream into complex symbols by encoding and modulating the information bit stream, and up-converts the complex symbols to an RF signal. According to the OFDM scheme, the transmitter 2250 maps the complex symbols to the subcarriers and constitutes OFDM symbols through Inverse FFT (IFFT).

The ARQ controller 2260 controls data transmission and retransmission according to an ARQ of a MAC layer. More specifically, the ARQ controller 2260 controls the message generator 2241 to generate the ACK, the NACK, the R-ACK, or the R-NACK according to the determination made by the error checker 2221. Based on the data reception success or data reception failure of the upper node, the ARQ controller 2260 controls the data output and the data deletion of the data buffer 2230. An ARQ timer 2263 of the ARQ controller 2260 is used to determine whether the data transmission is successful. The ARQ timer 2263 starts at the initial data transmission and ends after a defined time elapses. When the ARQ timer 2263 expires without the R-ACK or the ACK being received from the upper node, the ARQ controller 2260 determines that data reception failed.

The relay station structure of FIG. 22 is applicable to both the relay station M and the relay station 1.

When the relay station is the relay station M in the first or fourth exemplary embodiment, the ARQ controller 2260 operates as follows. When the data received from the terminal is corrupted, the ARQ controller 2260 controls the message generator 2241 and the transmitter 2250 to send the NACK to the terminal. In contrast, when the data received from the terminal has no error, the ARQ controller 2260 controls the data buffer 2230, the data generator 2240, and the transmitter 2250 to forward the data to the upper node. Next, when receiving the R-NACK from the upper node, the ARQ controller 2260 controls the data buffer 2230, the data generator 2240, and the transmitter 2250 to retransmit the data to the upper node. When receiving the R-ACK from the upper node, the ARQ controller 2260 controls the message generator 2241 and the transmitter 2250 to send the ACK to the terminal.

When the relay station is the relay station M in the second or third exemplary embodiment, the ARQ controller 2260 operates as described below. When the data received from the terminal has an error, the ARQ controller 2260 controls the message generator 2241 and the transmitter 2250 to send the NACK to the terminal. When the data received from the terminal has no error, the ARQ controller 2260 controls the message generator 2241 and the transmitter 2250 to send the ACK to the terminal and controls the data buffer 2230, the data generator 2240, and the transmitter 2250 to forward the data to the upper node. Next, upon receiving the R-NACK from the upper node, the ARQ controller 2260 controls the data buffer 2230, the data generator 2240, and the transmitter 2250 to retransmit the data to the upper node.

When the relay station is the relay station 1 in the third or fourth exemplary embodiment, the ARQ controller 2260 operates as described below. When the data received from the lower node has an error, the ARQ controller 2260 controls the message generator 2241 and the transmitter 2250 to send the R-NACK to the lower node. When the data received from the lower node is free from error, the ARQ controller 2260 controls the data buffer 2230, the data generator 2240, and the transmitter 2250 to relay the data to the upper node. Next, receiving the R-NACK from the upper node, the ARQ controller 2260 controls the message generator 2241 and the transmitter 2250 to send the R-NACK to the lower node. Receiving the R-ACK from the upper node, the ARQ controller 2260 controls the message generator 2241 and the transmitter 2250 to send the R-ACK to the lower node.

When the relay station is the relay station M in the fifth exemplary embodiment of the present invention, the ARQ controller 2260 operates as described below. When the data received from the terminal has an error, the ARQ controller 2260 controls the message generator 2241 and the transmitter 2250 to send the NACK to the terminal. When the data received from the terminal has no error, the ARQ controller 2260 controls the data buffer 2230, the data generator 2240, and the transmitter 2250 to relay the data to the upper node. Next, upon receiving the R-NACK or the NACK from the upper node, the ARQ controller 2260 controls the data buffer 2230, the data generator 2240, and the transmitter 2250 to retransmit the data to the upper node. In contrast, upon receiving the R-ACK from the upper node, the ARQ controller 2260 waits to receive the ACK. When receiving both of the R-ACK and the ACK, the ARQ controller 2260 controls the message generator 2241 and the transmitter 2250 to send the ACK to the terminal.

When the relay station is the relay station M in the sixth exemplary embodiment of the present invention, the ARQ controller 2260 operates as described below. When the data received from the terminal has an error, the ARQ controller 2260 controls the message generator 2241 and the transmitter 2250 to send the NACK to the terminal. When the data received from the terminal has no error, the ARQ controller 2260 controls the data buffer 2230, the data generator 2240, and the transmitter 2250 to relay the data to the upper node. Next, upon receiving the R-NACK from the upper node, the ARQ controller 2260 controls the data buffer 2230, the data generator 2240, and the transmitter 2250 to retransmit the data to the upper node. In contrast, upon receiving the ACK from the upper node, the ARQ controller 2260 controls the message generator 2241 and the transmitter 2250 to send the ACK to the terminal. In the sixth embodiment, the transmission of the R-ACK can be added depending on the intention of the practitioner. In this case, when both of the R-ACK and the ACK are received, the ARQ controller 2260 controls the message generator 2241 and the transmitter 2250 to send the ACK to the terminal.

When the relay station is the relay station M in the seventh exemplary embodiment of the present invention, the ARQ controller 2260 operates as described below. When the data received from the terminal has an error, the ARQ controller 2260 controls the message generator 2241 and the transmitter 2250 to send the NACK to the terminal. When the data received from the terminal has no error, the ARQ controller 2260 controls the message generator 2241 and the transmitter 2250 to send the ACK to the terminal and controls the data buffer 2230, the data generator 2240, and the transmitter 2250 to relay the data to the upper node. Next, when receiving the R-NACK or the NACK from the upper node, the ARQ controller 2260 controls the data buffer 2230, the data generator 2240, and the transmitter 2250 to retransmit the data to the upper node. When receiving the R-ACK from the upper node, the ARQ controller 2260 waits to receive the ACK. Upon receiving both of the R-ACK and the ACK, the ARQ controller 2260 determines that the data reception is successful.

When the relay station is the relay station M in the eight exemplary embodiment of the present invention, the ARQ controller 2260 operates as described below. When the data received from the terminal has an error, the ARQ controller 2260 controls the message generator 2241 and the transmitter 2250 to send the NACK to the terminal. When the data received from the terminal has no error, the ARQ controller 2260 controls the message generator 2241 and the transmitter 2250 to send the ACK to the terminal and controls the data buffer 2230, the data generator 2240, and the transmitter 2250 to relay the data to the upper node. Next, receiving the R-NACK from the upper node, the ARQ controller 2260 controls the data buffer 2230, the data generator 2240, and the transmitter 2250 to retransmit the data to the upper node. In contrast, receiving the ACK from the upper node, the ARQ controller 2260 determines that the data transmission is successful. In the eighth embodiment, the transmission of the R-ACK can be added depending on the intention of the practitioner. In this case, when both of the R-ACK and the ACK are received, the ARQ controller 2260 determines that the data transmission is successful.

When the relay station is the relay station 1 in the fifth or seventh exemplary embodiment, the ARQ controller 2260 operates as described below. When the data received from the lower node has an error, the ARQ controller 2260 controls the message generator 2241 and the transmitter 2250 to send the R-NACK to the lower node. When the data received from the lower node is free from error, the ARQ controller 2260 sends the R-ACK to the lower node and controls the data buffer 2230, the data generator 2240, and the transmitter 2250 to relay the data to the upper node. Next, upon receiving the NACK from the upper node, the ARQ controller 2260 controls the message generator 2241 and the transmitter 2250 to send the NACK to the lower node. When receiving the ACK from the upper node, the ARQ controller 2260 controls the message generator 2241 and the transmitter 2250 to send the ACK to the lower node.

When the relay station is the relay station 1 in the sixth or eighth exemplary embodiment, the ARQ controller 2260 operates as described below. When the data received from the lower node has an error, the ARQ controller 2260 controls the message generator 2241 and the transmitter 2250 to send the R-NACK to the lower node. When the data received from the lower node is free from error, the ARQ controller 2260 controls the data buffer 2230, the data generator 2240, and the transmitter 2250 to relay the data to the upper node. Next, upon receiving the NACK from the upper node, the ARQ controller 2260 controls the data buffer 2230, the data generator 2240, and the transmitter 2250 to retransmit the data to the upper node. When receiving the ACK from the upper node, the ARQ controller 2260 controls the message generator 2241 and the transmitter 2250 to send the ACK to the lower node. In the sixth or eighth embodiment, the transmission of the R-ACK can be added depending on the intention of the practitioner. In this case, when the data received from the lower node has no error, the ARQ controller 2260 controls the data generator 2240 and the transmitter 2250 to send the R-ACK to the lower node.

As set forth above, since the ARQ of the relay link is conducted separately from the ARQ of the access link in the wireless relay communication system, the data retransmission efficiency according to the ARQ of the MAC layer can be enhanced.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A wireless multi-hop relay communication system, the system comprising:
    a terminal for transmitting an Automatic Retransmission reQuest (ARQ) block of a Media Access Control (MAC) layer in an access link;
    an access link relay station for determining if there is an error in the ARQ block received over the access link, for sending a Non-ACKnowledge (NACK) to the terminal when the ARQ block has an error, and for sending only a single ACKnowledge (ACK) regarding the ARQ block based on a predefined condition, wherein the predefined condition comprises one of a condition where the ARQ block has no error and a condition where a Relay-ACK (R-ACK) regarding the ARQ block is received from an upper node; and
    a base station for determining if there is an error in the ARQ block received over the relay link.

2. The system of claim 1, wherein the access link relay station sends the ARQ block to an upper node over a relay link when the ARQ block has no error.

3. The system of claim 2, further comprising:
    a relay link relay station for determining if there is an error in an ARQ block received from a lower node, for sending a Relay-NACK (R-NACK) to the lower node when the ARQ block has an error, for sending the ARQ block to the base station when the ARQ block has no error, and for sending R-ACK to the lower node when the R-ACK is received from the base station.

4. The system of claim 2, further comprising:
    a relay link relay station for determining if there is an error in an ARQ block received from a lower node, for sending a Relay-NACK (R-NACK) to the lower node when the ARQ block has an error, for sending the ARQ block to the base station when the ARQ block has no error, and for sending a Relay-ACK (R-ACK) to the lower node when the R-ACK is received from the base station.

5. The system of claim 2, wherein the access link relay station retransmits the ARQ block to the upper node when a Relay-NACK (R-NACK) or a NACK is received from the upper node, and determines that transmission of the ARQ block is successful when an ACK is received from the upper node, and
    further comprising:
    a relay link relay station for determining if there is an error in an ARQ block received from a lower node, for sending an R-NACK to the lower node when the ARQ block has an error, for sending a Relay-ACK (R-ACK) to the lower node, for sending the ARQ block to the base station when the ARQ block has no error, for sending a NACK to the access link relay station when the NACK is received from the base station, and for sending an ACK to the lower node when the ACK is received from the base station.

6. The system of claim 2, wherein the access link relay station retransmits the ARQ block to the upper node when a Relay-NACK (R-NACK) is received from the upper node, and determines that the transmission of the ARQ block is successful when an ACK is received from the upper node, and
    further comprising:
    a relay link relay station for determining if there is an error in an ARQ block received from a lower node, for sending an R-NACK to the lower node when the ARQ block has an error, for sending the ARQ block to the base station when the ARQ block has no error, for retransmitting the ARQ block to the base station when a NACK is received from the base station, and for sending an ACK to the lower node when the ACK is received from the base station.

7. An uplink communication method of a relay station on an access link in a wireless multi-hop relay communication system, the method comprising:
    receiving an Automatic Retransmission reQuest (ARQ) block of a Media Access Control (MAC) layer from a terminal over an access link;
    determining if there is an error in the ARQ block;
    sending Non-ACKnowledge (NACK) to the terminal when the ARQ block has an error; and
    sending only a single ACKnowledge (ACK) regarding the ARQ block based on a predefined condition,
    wherein the predefined condition comprises one of a condition where the ARQ block has no error and a condition where a Relay-ACK (R-ACK) regarding the ARQ block is received from an upper node.

8. The method of claim 7, further comprising:
    when the ARQ block has no error, transmitting the ARQ block to an upper node in a relay link.

9. The method of claim 7, further comprising:
    when a Relay-NACK (R-NACK) or a NACK is received from the upper node, retransmitting the ARQ block to the upper node.

10. An apparatus for a relay station on an access link in a wireless multi-hop relay communication system, the apparatus comprising:
    a receiver for receiving an Automatic Retransmission reQuest (ARQ) block of a Media Access Control (MAC) layer from a terminal over an access link;

a determiner for determining if there is an error in the ARQ block; and a transmitter for sending a Non-ACKnowledge (NACK) to the terminal when the ARQ block has an error, and for sending only a single ACKnowledge (ACK) regarding the ARQ block based on a predefined condition, wherein the predefined condition comprises one of a condition where the ARQ block has no error and a condition where a Relay-ACK (R-ACK) regarding the ARQ block is received from an upper node.

11. The apparatus of claim 10, wherein the transmitter sends the ARQ block to an upper node over a relay link when the ARQ block has no error.

12. The apparatus of claim 10, further comprising:

a controller for controlling to retransmit the ARQ block to the upper node when a Relay-NACK R-NACK or a NACK is received from the upper node.

* * * * *